United States Patent
Bors

(10) Patent No.: US 6,510,068 B1
(45) Date of Patent: Jan. 21, 2003

(54) PULSE WIDTH MODULATION UTILIZING A SHIFTED CONTROL SIGNAL

(76) Inventor: Douglas A. Bors, 10017 Northeast 23rd St., Bellevue, WA (US) 98004

(*) Notice: Subject to any disclaimer, the term of this patent is extended or adjusted under 35 U.S.C. 154(b) by 0 days.

(21) Appl. No.: 09/907,840

(22) Filed: Jul. 17, 2001

(51) Int. Cl.[7] .................. H02M 1/12; H02M 5/257; H02M 5/293
(52) U.S. Cl. .................. 363/163; 363/41
(58) Field of Search .................. 363/41, 159, 163

(56) References Cited

U.S. PATENT DOCUMENTS

| | | | | |
|---|---|---|---|---|
| 4,183,088 A | | 1/1980 | Simmons | 364/717 |
| 4,578,746 A | | 3/1986 | Gyugyi et al. | 363/161 |
| 4,654,573 A | | 3/1987 | Rough et al. | 320/2 |
| 4,941,079 A | | 7/1990 | Ooi | 363/132 |
| 4,954,764 A | | 9/1990 | Kim | 318/798 |
| 5,513,094 A | | 4/1996 | Stanley | 363/98 |
| 5,650,925 A | * | 7/1997 | Hesterman | 363/132 |
| 5,764,495 A | | 6/1998 | Faulk | 363/21 |
| 5,764,501 A | | 6/1998 | Limpaecher | 363/61 |
| 5,838,181 A | * | 11/1998 | Hesterman | 327/175 |
| 5,892,674 A | * | 4/1999 | Shimada et al. | 363/127 |
| 5,969,962 A | | 10/1999 | Gabor | 363/89 |
| 5,982,642 A | | 11/1999 | Herfurth | 363/21 |
| 5,982,645 A | | 11/1999 | Levran et al. | 363/37 |
| 6,075,717 A | * | 6/2000 | Kumar et al. | 363/87 |
| 6,107,776 A | | 8/2000 | Nakazawa | 318/811 |
| 6,144,172 A | | 11/2000 | Sun | 315/291 |

OTHER PUBLICATIONS

Hui, S.Y.R., "Novel Random PWM Schemes with Weighted Switching Decision", *IEEE Transactions on Power Electronics, vol.* 12(6):945–951, Nov. 1997.
Unitrode Products from Texas Instruments "UCC2817, UCC2818, UCC3817, UCC3818 BiCMOS Power Factor Preregulator", *Texas Instruments, SLUS395E*, Feb. 2000–Revised Apr. 2001, 18 pgs.

* cited by examiner

*Primary Examiner*—Bao Q. Vu
(74) *Attorney, Agent, or Firm*—Seed IP Law Group PLLC

(57) ABSTRACT

In one embodiment, a method for use with a power transfer device is characterized by shifting a control signal with a waveform having a randomly variable period; and switching said power transfer device with a resultant shifted control signal. In addition to the foregoing, other method embodiments are described in the claims, drawings, and text forming a part of the present application. In one or more various embodiments, related systems include but are not limited to circuitry and/or programming for effecting the foregoing-referenced method embodiments; the circuitry and/or programming can be virtually any combination of hardware, software, and/or firmware configured to effect the foregoing-referenced method embodiments depending upon the design choices of the system designer. In addition to the foregoing, other system embodiments are described in the claims, drawings, and text forming a part of the present application.

50 Claims, 18 Drawing Sheets

PULSE WIDTH MODULATION UTILIZING A SHIFTED CONTROL SIGNAL

TECHNICAL FIELD

The methods and systems presented below are related, in general, to electrical power transfer devices. The methods and systems presented below are related, in particular, to electrical power transfer devices wherein pulse width modulation is used.

BACKGROUND OF THE INVENTION

When used in electrical power transfer devices, pulse width modulation is a technique whereby various aspects of electrical power transfer devices are controlled. Typically, in pulse width modulation, a DC power source capable of producing at least two different discrete voltage levels (e.g., a "high" voltage level such as five volts, and a "low" voltage level such as zero volts) is utilized such that the time during which the voltage is high controls a particular power transfer device. For example, the time during which the voltage is high can be used to control a DC motor by driving the DC motor with short pulses. The longer the pulses, the faster the motor turns, and vice versa.

Graphically, the output of the voltage source over time will look like a train of pulses, where the widths of pulses in the train are varied such that effective control of the power transfer device takes place. Accordingly, insofar as modulation is generally defined as a regulating according to measure or proportion, and since the widths of various electric pulses in the train are being varied to ensure that some aspect of the power transfer device is being effectively controlled, controlling the widths of the various pulses to ensure that some aspect of the power transfer device is being effectively controlled is often referred to as "pulse width modulation."

Insofar as pulse modulation schemes modulate pulse widths in order to control devices, a pulse modulation scheme needs an unmodulated train of pulses whose widths can be varied. The common way in which such an unmodulated train of pulses is produced within the related art is to use a standard digital clock circuit as the source of the unmodulated pulse train. A standard digital clock circuit produces a high voltage-low voltage alternating waveform of a prespecified period. Accordingly, it is possible to use a standard digital clock circuit to produce a pulse width modulated signal having a positive moving pulse width between a value greater than zero and less than one part of the period of the clock signal. The related art recognizes the foregoing scheme as the method of choice for generating pulse width modulated control signals. In addition, although the preceding discussion described generation of pulse width modulated signals via the use of a clock signal, those having ordinary skill in the art will appreciate that other pulse width modulation schemes likewise exhibit strong fundamental frequency characteristics, even though such pulse width modulation schemes might not directly use a clock signal.

SUMMARY OF THE INVENTION

In one embodiment, a method for use with a power transfer device is characterized by shifting a control signal with a waveform having a randomly variable period; and switching the power transfer device with a resultant shifted control signal.

In another embodiment of the method, the power transfer device is characterized by: a DC-to-AC converter, a DC-to-DC pulse width modulated converter, a DC-to-transformer tank circuit controller, a DC-to-wave generating controller, a DC-to-AC power converter, or an AC-to-AC power flow controller.

In another embodiment of the method, shifting a control signal with a waveform having a randomly variable period is characterized by: introducing at least one random timing variation into a fixed-frequency periodic control signal.

In another embodiment of the method, shifting a control signal with a waveform having a randomly variable period is characterized by: shifting one or more individual pulses in response to at least one substantially instantaneous magnitude selected out from a random noise reference.

In another embodiment of the method, shifting one or more individual pulses in response to at least one substantially instantaneous magnitude selected out from a random noise reference is characterized by: prespecifying an upper limit timing variation and a lower limit timing variation for each successive time delay.

In another embodiment of the method, shifting one or more individual pulses in response to at least one substantially instantaneous magnitude selected out from a random noise reference is characterized by: screening at least one pulse from the control signal to obtain the one or more individual pulses.

In another embodiment of the method, shifting one or more individual pulses in response to at least one substantially instantaneous magnitude selected out from a random noise reference is characterized by: shifting an upward edge of an individual pulse; shifting a downward edge of the individual pulse; and constructing a quasi-time-shifted version of the individual pulse from the shifted upward edge and shifted downward edge of the individual pulse.

In another embodiment of the method, switching the power transfer device with a resultant shifted control signal is characterized by: controlling a wave-shaping device with the control signal.

In another embodiment of the method, controlling a wave-shaping device with the shifted control signal is characterized by: controlling a wave-shaping device in an uninterruptible power system, or a wave-shaping device in a variable frequency motor controller, or a wave-shaping device in a DC-to-AC power conversion system used to feed an AC power utility grid.

In another embodiment of the method, the wave-shaping device is a related-art wave-shaping device that is otherwise controlled with the unshifted control signal, whereby the method is substantially backwards compatible with the related-art wave-shaping device.

In another embodiment of the method, switching the power transfer device with a resultant shifted control signal is characterized by: controlling a wave-shaping device with the shifted control signal, thus allowing operation of the wave-shaping device at an average frequency within the audio range but without a fixed audio frequency signal.

In another embodiment of the method, the power transfer device is a related-art power transfer device that is otherwise switched with the unshifted control signal, whereby the method is substantially backwards compatible with the related-art power transfer device.

In another embodiment of the method, switching the power transfer device with a resultant shifted control signal is characterized by: switching said power transfer device with the shifted control signal, thus allowing operation of said power transfer device at an average frequency within the audio range but without a fixed audio frequency signal.

In another embodiment of the method, shifting a control signal with a waveform having a randomly variable period is characterized by: generating a series of random numbers; obtaining timing information from the control signal in a digital format; shifting the obtained timing information by using the series of random numbers to calculate a timing shift from each random number to result in shifted timing information; transforming the shifted timing information to establish a digital-format resultant shifted control signal; and establishing the resultant shifted control signal from the digital-format resultant shifted control signal.

In another embodiment of the method, generating a series of random numbers is characterized by: selecting at least one digital bit from a stored group of digital bits in order to simulate the results desired from a series of random numbers.

In another embodiment of the method, switching the power transfer device with a resultant shifted control signal is characterized by: controlling a wave-shaping device with the shifted control signal.

In another embodiment of the method, controlling a wave-shaping device with the shifted control signal is characterized by: controlling a wave-shaping device in an uninterruptible power system, or a wave-shaping device in a variable frequency motor controller, or a wave-shaping device in a DC-to-AC power conversion system used to feed an AC power utility grid.

In another embodiment of the method, the wave-shaping device is a related-art wave-shaping device that is otherwise controlled with the unshifted control signal, whereby the method is substantially backwards compatible with the related-art wave-shaping device.

In another embodiment of the method, switching the power transfer device with a resultant shifted control signal is characterized by: controlling a wave-shaping device with the shifted control signal, thus allowing operation of the wave-shaping device at an average frequency within the audio range but without a fixed audio frequency signal.

In another embodiment of the method, the power transfer device is a related-art power transfer device that is otherwise switched with the unshifted control signal, whereby the method is substantially backwards compatible with the related-art power transfer device.

In another embodiment of the method, switching the power transfer device with a resultant shifted control signal is characterized by: switching the power transfer device with the shifted control signal, thus allowing operation of the power transfer device at an average frequency within the audio range but without a fixed audio frequency signal.

In addition to the foregoing, other method embodiments are described in the claims, drawings, and text forming a part of the present application.

In one or more various embodiments, related systems include but are not limited to circuitry and/or programming for effecting the foregoing-referenced method embodiments; the circuitry and/or programming can be virtually any combination of hardware, software, and/or firmware configured to effect the foregoing-referenced method embodiments depending upon the design choices of the system designer.

In addition to the foregoing, other system embodiments are described in the claims, drawings, and text forming a part of the present application.

The foregoing is a summary and thus contains, by necessity; simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the non-limiting detailed description set forth herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

The use of the same reference symbols in different drawings indicates similar or identical items.

DETAILED DESCRIPTION OF THE INVENTION

The inventor has recognized that the foregoing-described related-art scheme for producing pulse width modulated signals has some detrimental effects. One such effect is that, if the clock signal which is being used to create the pulse width modulated control signal is within the range of human hearing, the creation of the pulse width modulated control signal will often be detected by humans as an irritating noise. Another such effect is that, even if the clock signal which is being used to create the pulse width modulated control signal is outside the range of human hearing, the mere fact that a repetitive clock signal is being used to create the pulse width modulation control signal means that strong repetitive harmonic signals will be created. The inventor has determined empirically that the use of such a repetitive clock signal to create the pulse width modulation control signal often causes electrical and/or mechanical damage to various electrical and/or mechanical components, and the inventor has postulated that this is because the strong harmonic signals produced by the pulse width modulation control signals often coincide with the electrical and/or mechanical resonant frequencies of electrically and/or mechanically damaged components.

Accordingly, the inventor has devised methods and systems which, in contradistinction to the related art, shift pulse width modulation control signals by use of a random noise signal.

Figure 1A:
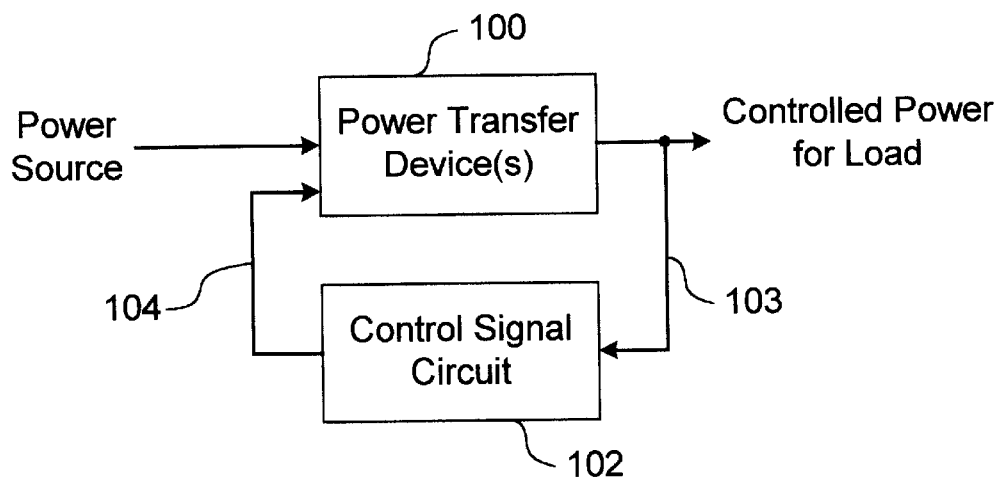
FIG. 1A shows a high-level block diagram.

With reference to the figures, and in particular with reference now to FIG. 1A, shown is a high-level block diagram. Depicted is that related-art power transfer device (s) 100 receives input from a power source and transmits controlled power to a load. Illustrated is that power transfer device(s) 100 receives control signal 104 from control signal circuit 102. Depicted is that control signal circuit 102 produces control signal 104 in response to feedback signal 103, which is a signal representative of the transmitted control power to the load. Although feedback signal 103 is described herein for sake of clarity, it is to be understood that the methods and system described herein are not limited to feedback loop systems. For example, those having ordinary skill in the art will appreciate that in cases where a feedback signal is not present (e.g., in cases where a power transfer device is creating a waveform through pulse-width averaging), the methods and systems described herein will still prove useful (e.g., in situations where a control signal is not produced in response to feedback signal, or in situations the feedback signal does have some influence on the control signal, but only indirectly).

Figure 1B:
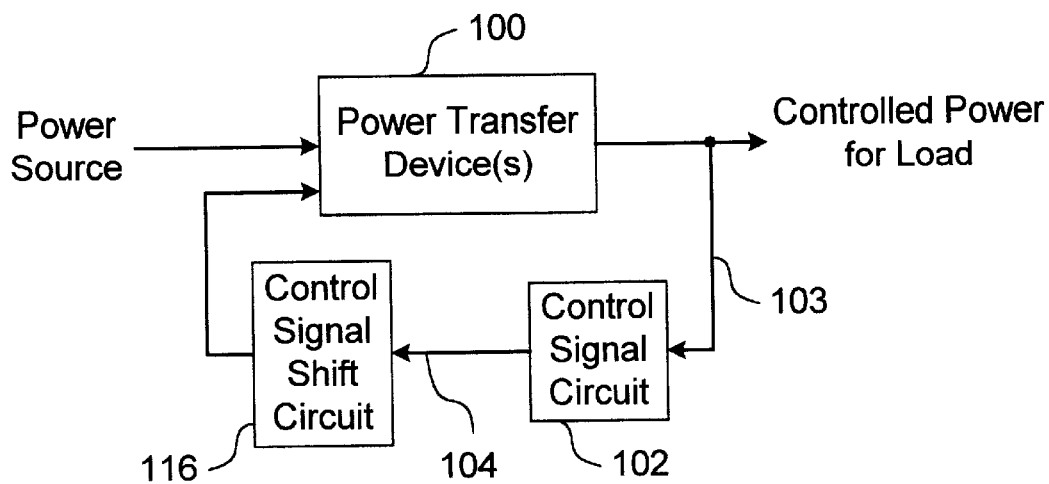
FIG. 1B depicts a high-level block diagram of the system of FIG. 1A that has been modified in accordance with methods and systems described here.

Referring now to FIG. 1B, depicted is a high-level block diagram of the system of FIG. 1A that has been modified in accordance with methods and systems described here. Depicted is control signal shift circuit 116 interposed between control signal circuit 102 and power transfer device 100. As described below, in one embodiment, control signal shift circuit 116 shifts control signal 104 to reduce deleterious effects associated with harmonics (both auditory and electrical), but does so in such a way that the related art components still function correctly. While the high-level block diagram of FIG. 1B shows control signal shift circuit 116 interposed between related-art control signal circuit 102 and power transfer device(s) 100 for sake of illustrating the backwards compatibility of control signal shift circuit 116 with the related art, those having ordinary skill in the art will appreciate that the use of control signal shift circuit 116 is not limited to use with the related art, but may instead be used with future systems.

Figure 2:
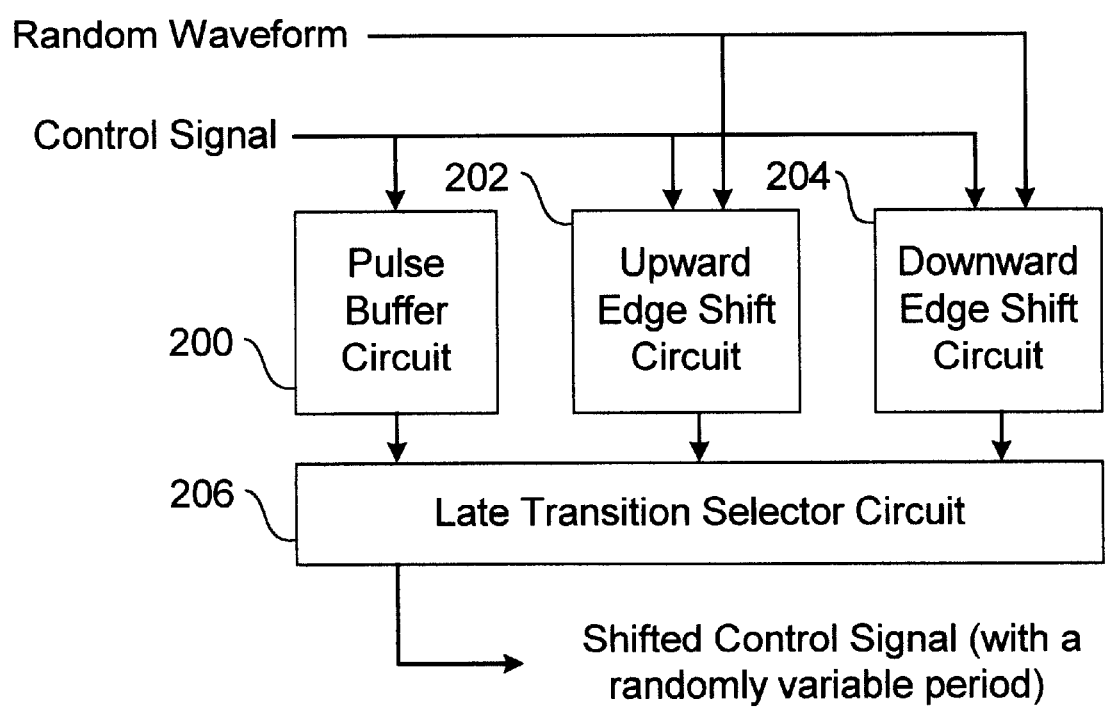
FIG. 2 illustrates a high-level block diagram depicting components of one embodiment of control signal shift circuit 116.

With reference now to FIG. 2, illustrated is a high-level block diagram depicting components of one embodiment of control signal shift circuit 116. Illustrated is that control signal shift circuit 116 receives control signal 104 and a random waveform (further described in relation to FIG. 4) as input. Shown is that in one embodiment, control signal shift circuit 116 has four components: (1) pulse buffer circuit 200, (2) upward edge shift circuit 202 (used to shift the upward moving edge of one or more control signal pulses, as described herein), (3) downward edge shift circuit 204 (used to shift the downward moving edge of one or more control signal pulses, as described herein), and (4) late transition selector circuit 206 (used to reconstruct the resulting edge shift transitions into a quasi-time-shifted version of control signal 104, as described herein).

Figure 3:
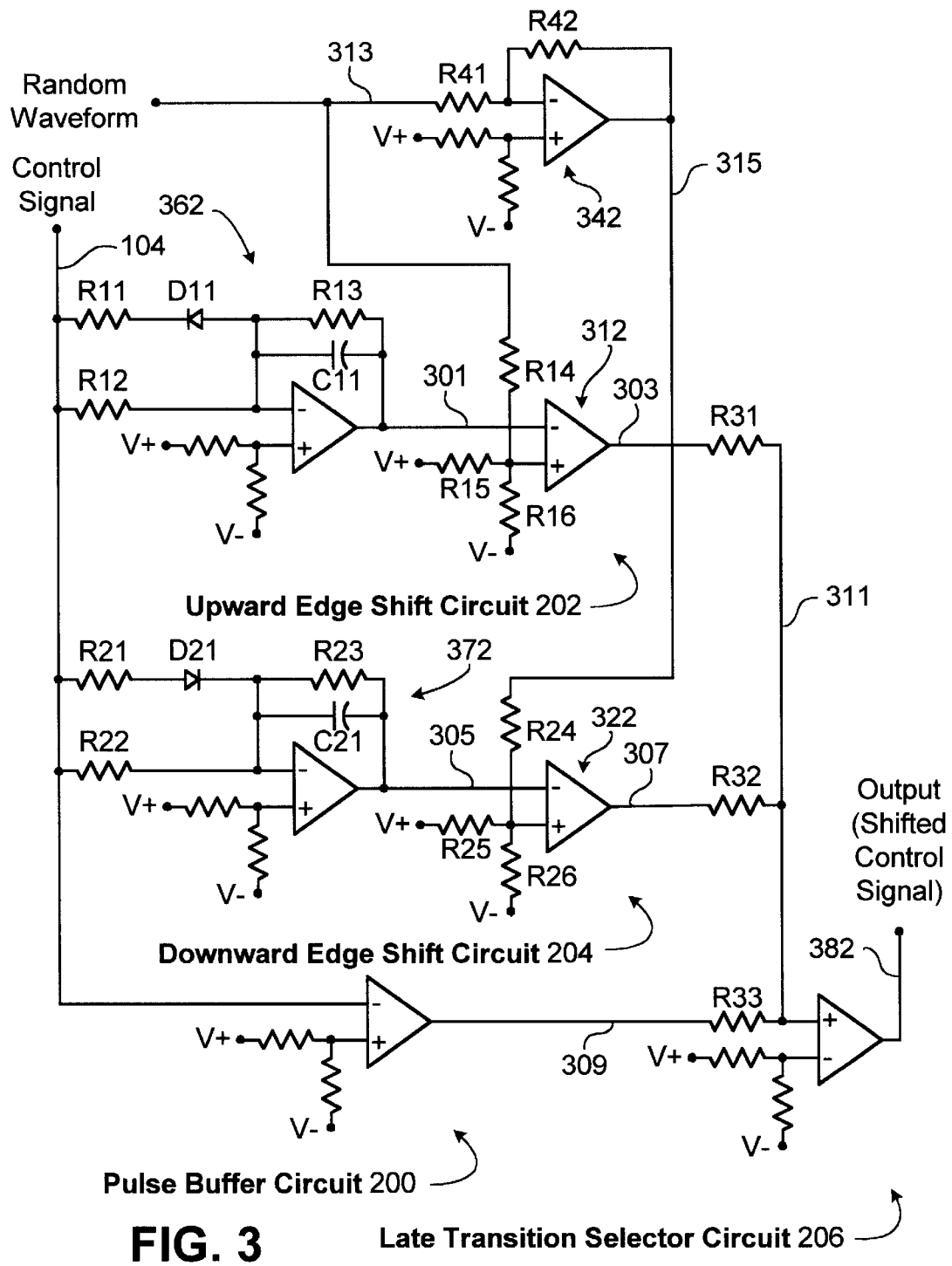
FIGS. 3, 5, and 6, illustrate an analog circuit diagram (FIG. 3) and graphical representations of certain outputs of the analog circuit diagram (FIGS. 5, and 6) that identify one embodiment of one control signal shift circuit 116.
Figure 5:
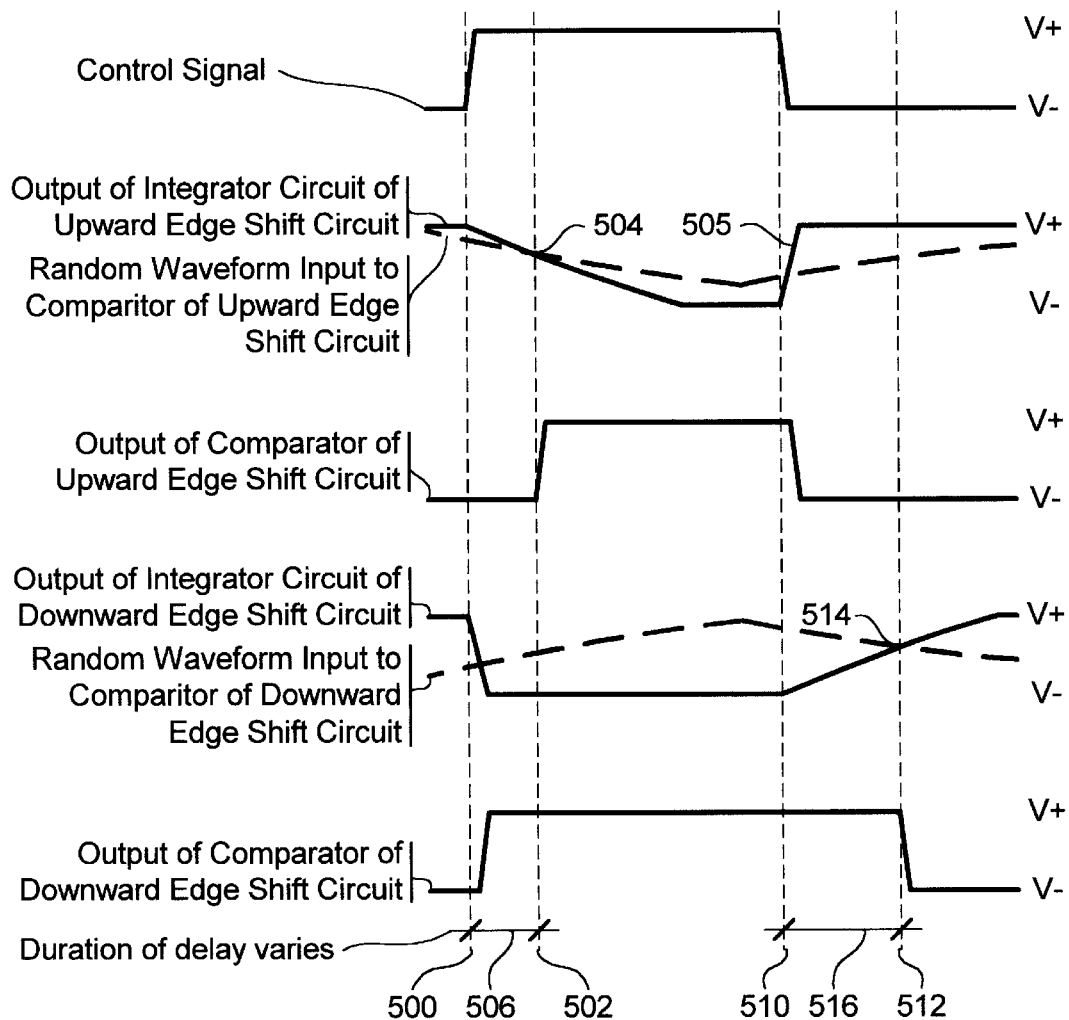
Figure 6:
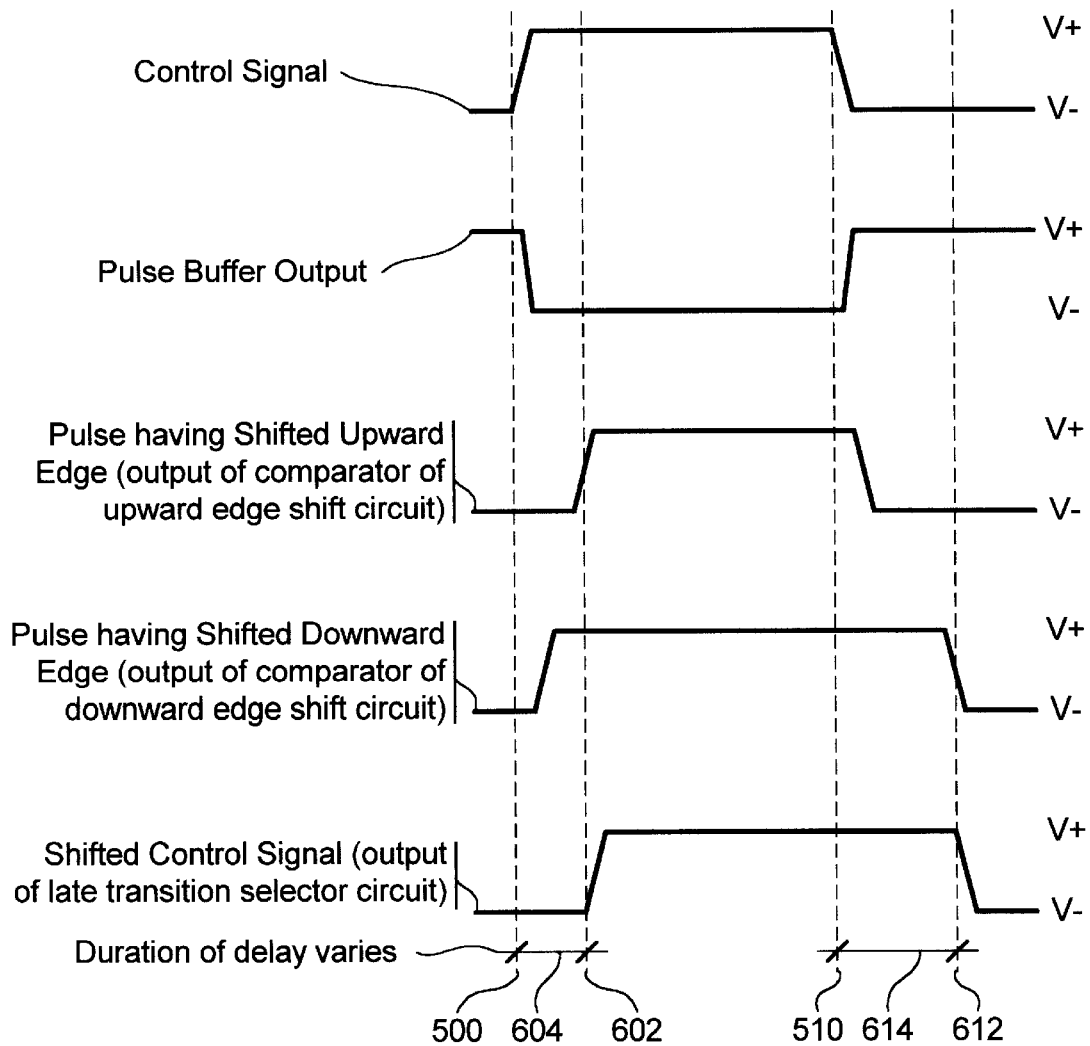

With reference now to FIGS. 3, 5, and 6, illustrated are an analog circuit diagram (FIG. 3) and graphical representations of certain outputs of the analog circuit diagram (FIGS. 5, and 6) that identify one embodiment of one control signal shift circuit 116. With respect to FIG. 3, depicted is that control signal 104 (e.g., a square wave pulse train) is substantially simultaneously applied to pulse buffer circuit 200, upward edge shift circuit 202, and downward edge shift circuit 204.

The general functioning of the four component circuits of FIG. 3 is as follows. Upward edge shift circuit 202 produces output 303 which includes a time-shifted upward edge of a single pulse of control signal 104 (e.g., see FIGS. 5 and 6), where the amount of shift will be determined, in large part, by the substantially instantaneous value of random waveform signal 313. Downward edge shift circuit 204 produces output 307 which includes a time-shifted downward edge of a single pulse of control signal 104 (e.g., see FIGS. 5 and 6), where the amount of shift will be determined, in large part, by the substantially instantaneous value of inverted random waveform signal 315. Late transition selector circuit 206 creates a quasi-time-shifted version of a pulse of control signal 104, where the upwards edge of the quasi-time-shifted version of a pulse of control signal 104 is constructed from the time-shifted upward edge of control signal 104, and where the downward edge of the quasi-time-shifted version of the pulse of control signal 104 is constructed from the time-shifted downward edge of control signal 104 (e.g., see FIG. 6). Lastly, pulse buffer circuit 200 helps to maintain the voltage of late transition selector circuit 206 in between the time shifted upward edge of control signal 104 and time shifted downward edge of control signal 104 (e.g., see FIGS. 5 and 6). How this is achieved is explained following.

With respect to upward edge shift circuit 202 (assuming for sake of example that output 301 of first integrator circuit 362 begins with its output "high" (V+) (e.g., see FIG. 5)), when control signal 104 (the input voltage of first integrator circuit 362) goes high, output voltage 301 of first integrator circuit 362 starts to go "low," or trend downwards toward V− volts (see FIG. 5). Those having ordinary skill in the art will recognize that exactly how fast output voltage 301 of first integrator circuit 362 will reach V− volts is controlled by the "time constant" of first integrator circuit 362; when control signal 104 is high (V+), diode D11 is not conducting, and hence the time constant of first integrator circuit 362 is controlled by the values of R12, R13 and C11. In one embodiment, R13 is selected with a resistance value more than ten times (10×) the resistance value of R12. Then the trending downwards of output voltage 301 is substantially determined by the balance of current through C11 and R12 during the time the voltage is trending downwards.

Shown is that output voltage 301 of integrator circuit serves as a first input to comparator circuit 312. (Those having ordinary skill in the art will recognize that comparator circuit 312 produces an output voltage based upon the results of a "comparison" between the voltages on comparator circuit 312's respective input terminals (hence the name "comparator"). Specifically, if the voltage value on the (−) input terminal of comparator 312 is greater than the voltage value on the (+) terminal of comparator 312, the output voltage of comparator circuit will be "low" (V−), while if the voltage value on the (−) input terminal of comparator 312 is less than the input voltage value on the (+) terminal of comparator 312, the output voltage of comparator 312 will be "high" (V+.))

In addition to the foregoing, depicted is that random waveform signal 313 serves as a second input to the "reference" (+) terminal of comparator circuit 312. Random waveform signal 313 is a time-varying voltage waveform, and when random waveform signal 313's substantially instantaneous value is such that it causes the voltage on reference terminal (+) of comparator 312 to be above that of the voltage value on terminal (−) on comparator 312, comparator 312 will trigger and output voltage 303 of comparator circuit 312 will go high (V+) (see FIG. 5, especially immediately to the right of point 504, where the voltage value of output 301 of first integrator 362 begins to be lower than the value of random waveform signal 313, thereby causing output 303 of comparator 312 to transition to high (V+)).

Note that since the V− trending output of first integrator circuit 362 is in response to control signal 104 going high (V+), output 303 of comparator circuit 312 is essentially the upward transition of control signal 104, delayed by some amount of time (see FIG. 5), where the time delay is that time at which the voltage of the random waveform on reference terminal (+) of comparator circuit 312 exceeds the voltage on terminal (−) of comparator circuit 312. Hence, the upward edge of control signal 104 has been shifted by use of the random waveform (see FIG. 5).

As noted previously, late transition selector circuit 206 creates a quasi-time-shifted version of a pulse of control signal 104, where the upwards edge of the quasi-time-shifted version of a pulse of a control signal is constructed from the time shifted upward edge of control signal 104. Continuing to refer to the circuit shown in FIG. 3, the output of comparator circuit 312 (e.g., the time-shifted upward edge of control signal 104 (see FIG. 5)) is utilized to construct an upward edge of a quasi-time-shifted version of control signal 104 as follows. Output voltage 303 of comparator 312 serves as input to late transition selector circuit 206. Those skilled in the art will appreciate that output voltage signal 382 of late transition selector circuit 206 will be substantially logically equivalent to whatever voltage is present on at least two out of three of late transition selector circuit 206's input voltage terminals (e.g., if at least two out of the three inputs are high (V+), output voltage signal 382 of late transition selector circuit 206 will be high (V+), and if at least two out of the three inputs are low (V−), output voltage signal 382 of late transition selector circuit 206 will be low (V−)).

Insofar as it is desired that the output voltage of late transition selector circuit 206 be a quasi-time-shifted version of control signal 104, and it is desired that the upward edge of the quasi-time-shifted version of control signal 104 track with the time-shifted upward edge of control signal 104, is preferable at this point to have at least one other of the inputs to late transition selector circuit be high (V+). This is achieved via output signal 307 of comparator 322.

Referring now to second integrator circuit 372, due to the fact that D21 is conducting when control signal 104 is high (V+), the voltage of output 305 rapidly goes low (V−), and hence the voltage value of output signal 307 of comparator 322 rapidly becomes high (V+) when control signal 104 is high (V+) (e.g., see FIG. 5) (R21 is chosen so as to give a very fast time constant for second integrator circuit 372). Accordingly, when control signal 104 goes high (V+), output 305 of second integrator circuit 372 goes low very fast (see FIG. 5), so by the time output 303 of comparator 312 transitions to high, output 307 is already high (V+) (see FIG. 5). Thus, since by the time output 303 of comparator 312 becomes high (V+), output signal 307 is already high (V+), two out of the three inputs of late transition selector circuit 206 are high (V+), and hence output 382 late transition selector circuit 206 will essentially track upwards to V+ when output 303 of comparator 312 transitions to high (V+) (see FIG. 6).

At this point, the quasi-time-shifted version of control signal 104 has been partially constructed (see FIG. 6). Knowing that at some point control signal 104 will transition back downwards to its low value, it is desired that output 382 of late transition selector circuit 206 stay high (V+) for some interval of time after control signal 104 goes low (e.g., see FIG. 6), and thereafter that the output of late transition selector circuit track downward in response to some time-shifted version of the downward transition of control signal 104 (e.g., see FIG. 6). This is achieved by the circuit in FIG. 3 as follows.

Those skilled in the art will appreciate that when control signal 104 goes low (V−), D11 begins conducting. Insofar as that R11 is chosen so as to give a very fast time constant for integrator circuit 362, the voltage value of output signal 301 rapidly goes high (V+), and hence the voltage value of output signal 303 of comparator 312 rapidly becomes low (V−) when control signal 104 is low (V−). However, as noted, it is desired that output 382 of late transition selector circuit 206 stay high (V+) for some period of time beyond when control signal 104 goes low (V−). This is ensured by pulse buffer circuit 200. That is, insofar as pulse buffer circuit 200 creates an inverted version of control signal 104, when control signal 104 goes low (V−) the output of pulse buffer circuit 104 goes high (V+), and thus even though output signal 303 of comparator 312 goes almost immediately low (V−), output 309 of pulse buffer circuit 206 will serve to maintain the output of late transition selector circuit 206 as high (V+), since at this point output 307 of comparator 322 is still high (V+) (see FIG. 6); that is, when control signal 104 is low, D21 is not conducting, and thus R21 is removed from the time constant of second integrator circuit 372, and hence the value of output 305 transitions more slowly, so output 307 of comparator 322 will tend to stay high (V+) for a substantial time.

Recalling that, at the present point in the example under discussion, the value of control signal 104 is high (V+), those skilled in the art will appreciate that output 305 of second integrator circuit 372 is low (V−) (see FIG. 5). When the value of control signal 104 transitions to low, output voltage 305 of second integrator circuit 372 starts to go "high" or trend upwards towards V+ volts (e.g., see FIG. 5) (those having ordinary skill in the art will recognize that second integrator circuit 372 is configured as an inverting circuit). Those having ordinary skill in the art will recognize that exactly how fast the output voltage of second integrator circuit will reach V+ volts is controlled by the "time constant" of second integrator circuit 372; when control signal 104 is low (e.g. V−), diode D21 is not conducting, and hence the time constant of second integrator circuit 372 is controlled by the values of R22, R23 and C21. In one embodiment, R23 is selected with a resistance value more than ten times (10×) the resistance value of R22. Then the trending upwards of output voltage 305 is substantially determined by the balance of current through C21 and R22 during the time the voltage is trending upwards.

Shown is that output voltage 305 of integrator circuit 372 serves as an input to comparator circuit 322. In addition to the foregoing, depicted is that inverted random waveform signal 315 serves as an input to the "reference" terminal (+) of comparator circuit 322. Inverted random waveform signal 315 is a time-varying voltage waveform, and when inverted random waveform signal 315's substantially instantaneous value is such that it causes the voltage on reference terminal (+) of comparator 322 to be below that of the voltage value on terminal (−) on comparator 322, comparator 322 will trigger and output voltage 307 of comparator circuit 322 will go low (V−) (e.g., see FIG. 5, especially immediately to the right of point 514, where the voltage value of output 305 of second integrator 372 begins to exceed the value of the inverted random waveform input), thereby causing the output 307 of comparator 322 of downward edge shift circuit to transition to low (V−).

Note that since at this point in time the voltage value of output 305 (which is trending upwards toward V+) of second integrator circuit 372 is in response to control signal 104 going low, output 307 of comparator circuit 322 is essentially the downward transition of control signal 104, delayed by some amount of time, where the time delay is that time at which the voltage of the random waveform on reference terminal (+) of comparator circuit 322 becomes less than the value on terminal (−) of comparator circuit 322. Hence, the downward edge of control signal 104 has been shifted by use of the random waveform.

Insofar as it is desired that the output voltage of late transition selector circuit 206 be a quasi-time-shifted version of control signal 104, and since it is desired that the downward edge of the quasi-time-shifted version of control signal 104 track with the time-shifted downward edge of control signal 104, is preferable at this point to have at least one other of the inputs to late transition selector circuit go low. This is achieved via output signal 303 of comparator 312.

Due to the fact that D11 is conducting when control signal 104 is low (V−), the voltage value of output 301 of first integrator 362 becomes high, the voltage value of output signal 303 rapidly becomes low (V−) when control signal 104 is low (R11 is chosen to give a very fast time constant for first integrator circuit 362). Accordingly, by the time output 307 of comparator 322 transitions to low (V−), output 303 of comparator 312 is low (V−). Accordingly, since output 303 is already low (V−) by the time output signal 307 transitions to low (V−), two out of the three inputs of late transition selector circuit 206 are low (V−), and hence late transition selector circuit will essentially track downwards to V− when output 307 of comparator 322 transitions to low (V−) (e.g., see FIG. 6).

Thus, as has been demonstrated, the analog circuit of FIG. 3 will result in a quasi-time-shifted version of a pulse of control signal 104.

Throughout the preceding discussion, those having ordinary skill in the art might have recognized that the random waveforms (inverted and non-inverted) drawn in FIG. 5 varied slowly enough such that the outputs of comparators 312 and 322 were not disturbed by the random waveform once the comparators had been respectively "triggered" at points 504 and 514. That is, the random waveform was frequency limited such that the logic of the circuit in FIG. 3 functions. Those skilled in the art will recognize that for any particular embodiment the appropriate amount of frequency limiting can be determined empirically. However, in other embodiments, it is possible to describe the constraints on the random waveform more formally, and one such embodiment will now be discussed.

In order to ensure that each comparator (e.g., comparator 312 and 322) is not reset after each comparator (e.g., comparator 312 and 322) is switched for an upward or downward edge of a particular pulse, the random waveforms (e.g., the inverted and non-inverted waveforms shown in FIG. 5), as measured at each comparator input (e.g., the (+) terminal inputs of comparators 312 and 322), should preferably be such that the voltage magnitude of the random waveform at each input of each comparator changes more slowly than the voltage magnitude of the output of each integrator circuit (e.g., first integrator circuit 362 and second integrator circuit 372) serving as input to each comparator (e.g., comparator 312 and comparator 322) of each edge shift circuit (e.g., upward edge shift circuit 202 and downward edge shift circuit 204). That is, random waveform signal 313 at the (+) terminal input of comparator 312 of upward edge shift circuit 202 should preferably not decrease more rapidly than output 301 of first integrator circuit 362 of the upward edge shift circuit 202. Also, inverted random waveform signal 315 at the (+) input of comparator 322 of downward edge shift circuit 204 should preferably not increase more rapidly than output 305 of second integrator circuit 372 of downward edge shift circuit 204.

Referring now again to FIG. 5, note that the preferred rate of change of the voltage of each random waveform can be visualized as the slope of each random waveform over some period of time. As shown in FIG. 5, such slopes may be negative or positive, and the random waveform at the input to the comparator of each edge shift circuit should preferably meet the restriction with respect to its polarity. As will be appreciated by those having ordinary skill in the art, the random waveform at the input to the comparator of the upward edge shift circuit should preferably not decrease more rapidly than (i.e., should not have a negative slope that is less than) the (negative slope of the) output of the integrator circuit of the upward edge shift circuit. As will also be appreciated by those having ordinary skill in the art, the random waveform at the input to the comparator of the downward edge shift circuit should preferably not increase more rapidly than (i.e., should not have a positive slope that is greater than) the (positive slope of the) output of the integrator circuit of the upward edge shift circuit.

Figure 4A:
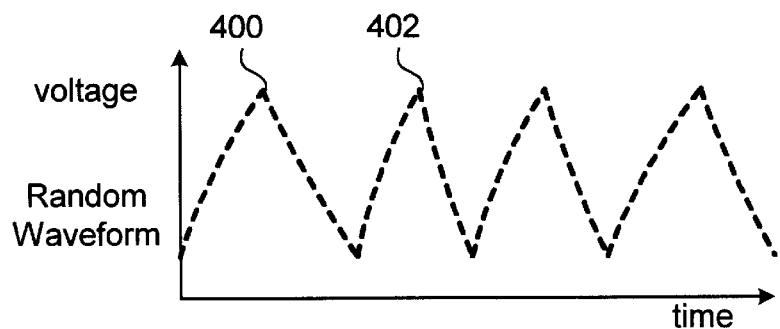
FIGS. 4A, 4B, 4C and 4D, FIG. 4A show a waveform similar to the results of an integrator circuit if the input is an uneven square wave with varying frequency.
Figure 4B:
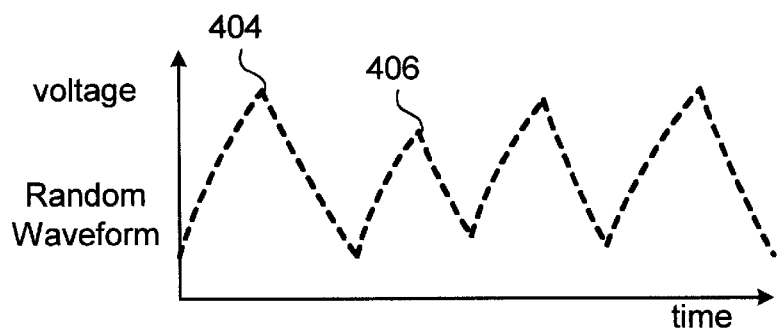
Figure 4C:
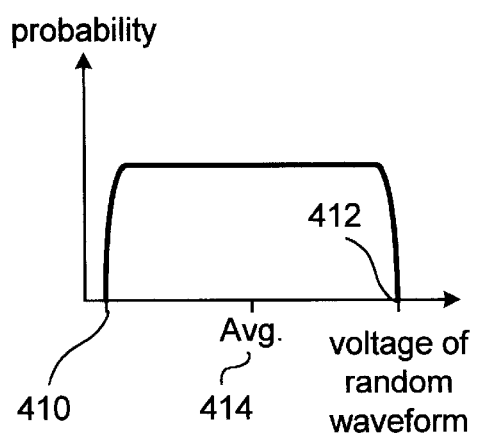
Figure 4D:
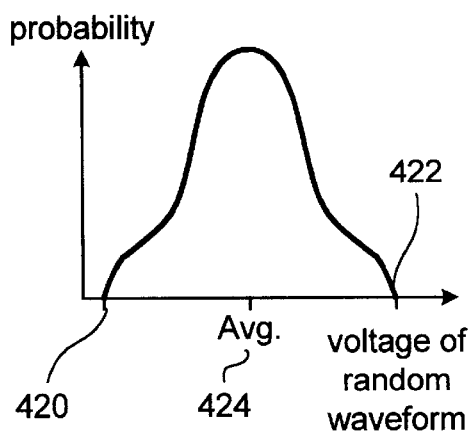

With reference now to FIGS. 4A, 4B, 4C and 4D, FIG. 4A shows a waveform similar to the results of an integrator circuit if the input is an uneven square wave with varying frequency. Subsequent peaks 400 and 402 are shown at approximately the same amplitude but each set of subsequent peaks occurs with different time intervals. In practice, this waveform is difficult to create with an analog circuit. The probability density function in FIG. 4C shows a flat probability density function for a voltage varying about an average value 414 and bounded between a low value 410 and a high value 412. The probability function in FIG. 4C approximately represents the probability density function of a random waveform like the waveform shown in FIG. 4A—characterized by equal excursions at the peaks and uneven timing between peaks. This is an ideal, flat probability density function. A second example of an adequate random waveform is shown in FIG. 4B, wherein subsequent peaks 404 and 406 may vary both in magnitude and in time interval. FIG. 4D shows a probability density function for a voltage varying about an average value 424 and bounded between a low value 420 and a high value 422, and this approximately represents the probability density function of a random waveform like the one shown in FIG. 4B. This is an adequate probability density function.

Figure 7:
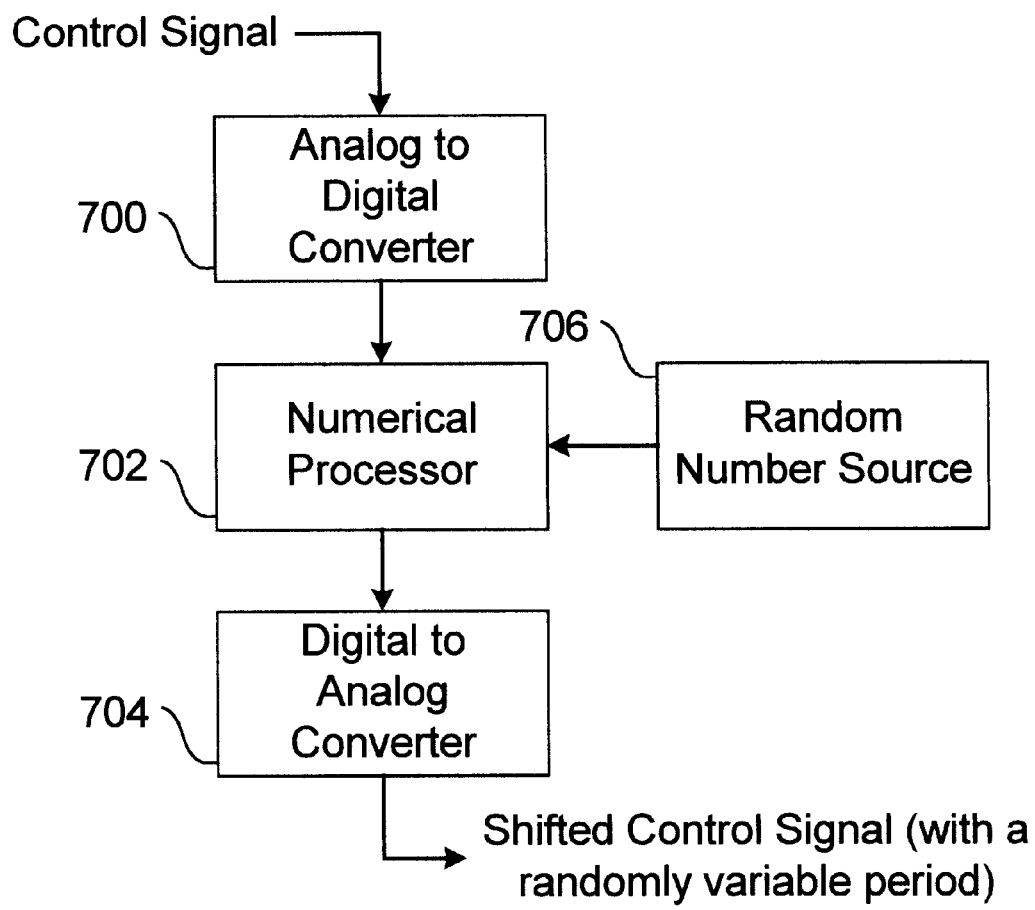
FIG. 7 depicts an environment that supports digital embodiments of methods and/or systems described herein.

Referring now to FIG. 7, depicted is an environment that supports digital embodiments of methods and/or systems described herein. For backward compatible embodiments and for many new embodiments an analog to digital converter 700 converts a control signal into digital timing information. In other embodiments, the control information may already be in a digital format; in those cases an analog to digital converter 700 may not be required. A numerical processor 702, complete with memory, CPU, and I/O components necessary to perform digital signal processing, is used to calculate appropriate shift values for one or more control signal pulses. The numerical processor 702 may also support other calculations in order to create an applicable waveform from the digital timing information. A digital to analog converter 704 is used to convert digital information to an analog waveform. In one case the numerical processor 702 may be used to calculate random numbers (or pseudo random numbers). In another case a separate random number source 706 provides a stream of random numbers, or random bits, to the numerical processor 702.

Figure 8:
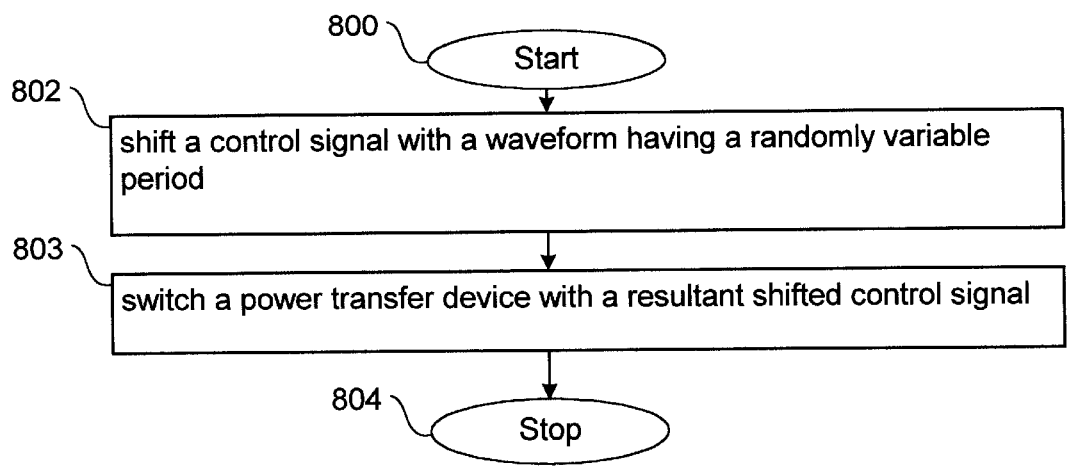
FIG. 8 shows a high-level logic flowchart depicting a process.

Referring now to FIG. 8, shown is a high-level logic flowchart depicting a process. Method step 800 shows the start of the process. Method step 802 depicts shifting a control signal with a waveform having a randomly variable period. Method step 803 shows switching a power transfer device with a resultant shifted control signal. Method step 804 illustrates the end of the process. In one device embodiment, method step 802 and 803 are achieved by a control signal shift circuit (e.g., control signal shift circuit 116) that shifts a control signal (e.g., that produced by control signal circuit 102) and then shifts a power transfer device (e.g., power transfer device(s) 100) with the resultant shifted control signal. At a high level, FIG. 8 shows the concept of a shifted control signal that contains different timing information that is randomly distributed around the original timing intervals. As seen by the foregoing device embodiment, in one embodiment the power transfer device referred to in method step 803 is a related-art power transfer device that is otherwise switched with the unshifted control signal (i.e., in at least one embodiment, the method is substantially backwards compatible with related-art power transfer devices). However, those having ordinary skill in the art will appreciate that the use of the process depicted and described in relation to FIG. 8 is not limited to use with the related art, but may instead be used with future systems.

Those having ordinary skill in the art will recognize that there are many different types of power transfer devices (e.g., power transfer device(s) 100), such as those illustrated by a power-transfer-device group including a DC-to-AC converter, a DC-to-DC pulse width modulated converter, a DC-to-transformer tank circuit controller, a DC-to-wave generating controller (e.g., an uninterruptible power supply or variable frequency motor drive), a DC-to-AC power converter (e.g., a wind power or solar power AC connection module), and an AC-to-AC power flow controller. Those skilled in the art will recognize that the foregoing list is exemplary and not exhaustive.

Figure 9:
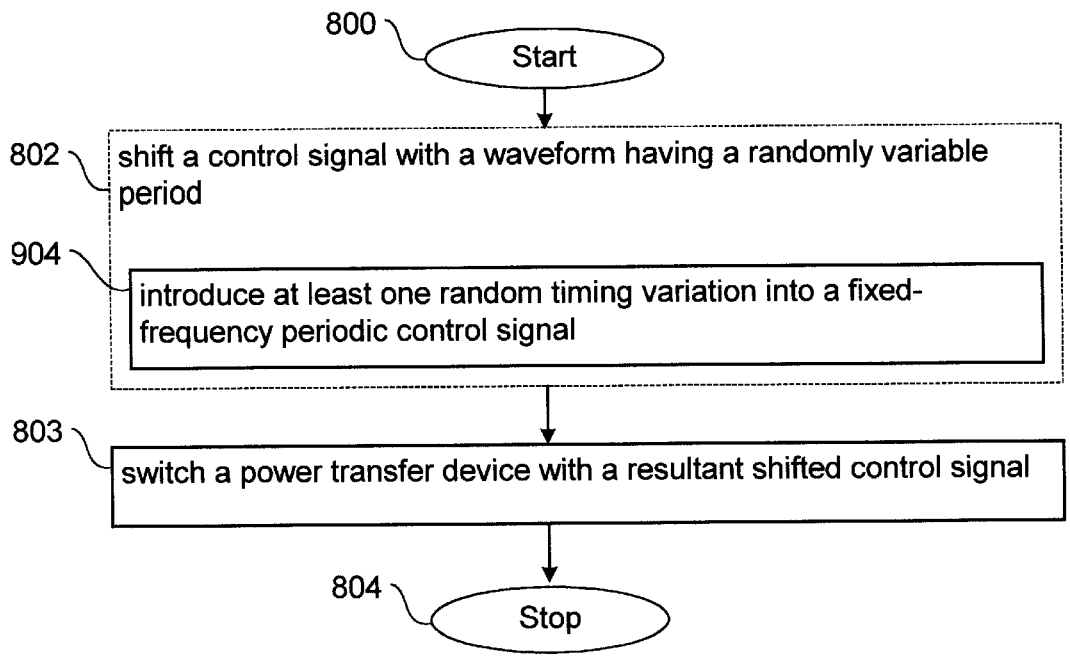
FIG. 9 shows a high-level logic flowchart depicting an alternate embodiment of the high-level logic flowchart of FIG. 8.

With reference now to FIG. 9, shown is a high-level logic flowchart depicting an alternate embodiment of the high-level logic flowchart of FIG. 8. Depicted is that in one embodiment method step 802 includes method sub-step 904. Illustrated is that, in one embodiment, shifting a control signal with a waveform having a randomly variable period can include, but is not limited to, introducing at least one random timing variation into a fixed-frequency periodic control signal. In one device embodiment, method step 904 is achieved by the analog circuits shown and described in relation to FIG. 3. In another embodiment, method step 904 is achieved via computational techniques that utilize numerical shifting of a numerical representation of a control signal (e.g., such as was described in relation to FIGS. 7 and 16). At a high level, FIG. 9 shows the concept of a shifted control signal that contains different timing information, specifically with random timing variations introduced into each control signal pulse. The random variations have the characteristic of making the original base frequency less defined while maintaining the information needed to regulate power transfer or to effectively shape power system waveforms. As an aside, those having ordinary skill in the art will appreciate that the random timing variations should preferably be substantially within the range of acceptable timing variations of the system in which the shifted control signal is to be deployed (e.g., the shifting produced by control signal shift circuit 116 should be within the range of acceptable timing variations of power transfer device 100).

Figure 10:
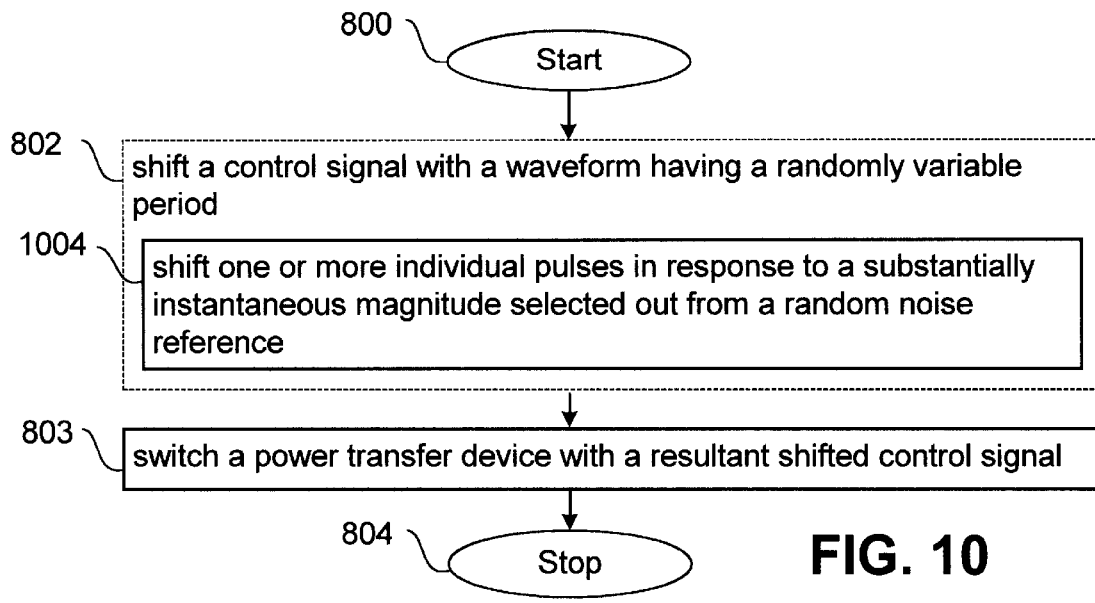
FIG. 10 shows a high-level logic flowchart depicting an alternate embodiment of the high-level logic flowchart of FIG. 8.

With reference now to FIG. 10, shown is a high-level logic flowchart depicting an alternate embodiment of the high-level logic flowchart of FIG. 8. Depicted is that in one embodiment method step 802 includes method sub-step 1004. Illustrated is that, in one embodiment, shifting a control signal with a waveform having a randomly variable period can include, but is not limited to, shifting one or more of individual pulses in response to at least one substantially instantaneous magnitude selected out from a random noise reference. In one device embodiment, method step 1004 is achieved via the analog circuits shown and described in relation to FIG. 3. In another embodiment, method step 1004 is achieved via computational techniques that utilize numerical shifting of a control pulse (e.g., such as was described in relation to FIGS. 7 and 16).

Figure 11:
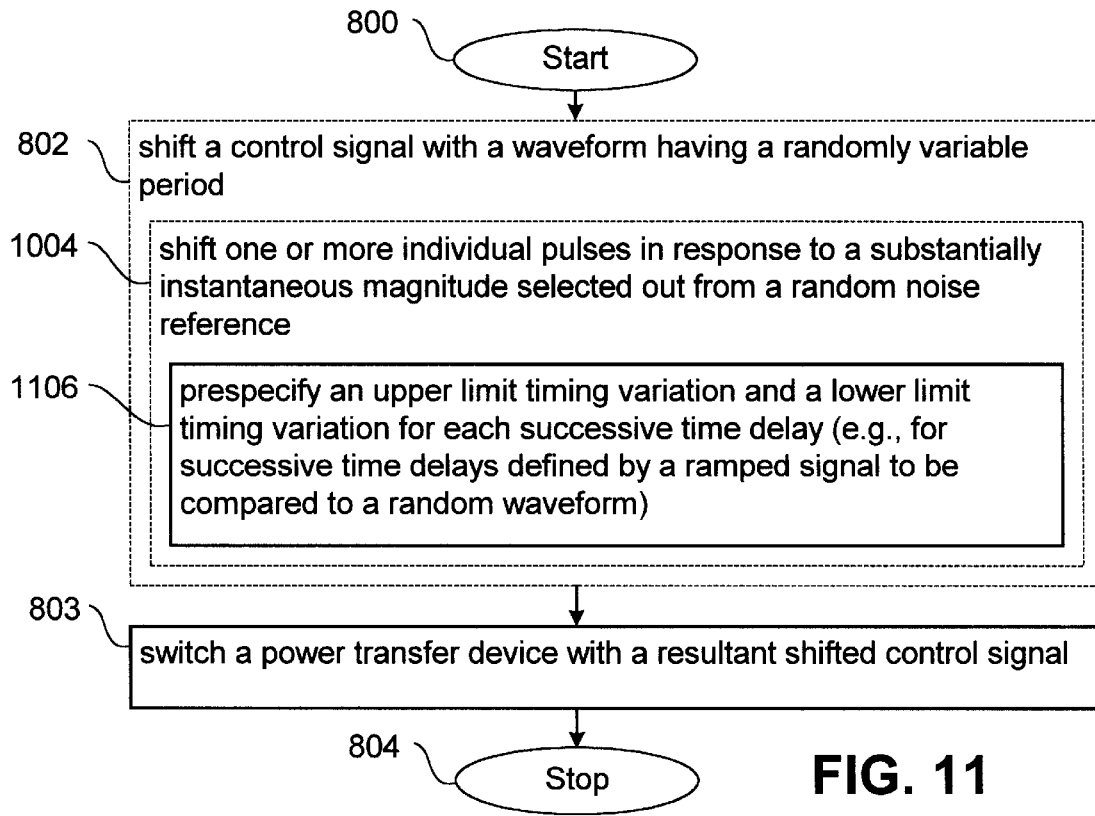
FIG. 11 shows a high-level logic flowchart depicting an alternate embodiment of the high-level logic flowchart of FIG. 10.

With reference now to FIG. 11, shown is a high-level logic flowchart depicting an alternate embodiment of the high-level logic flowchart of FIG. 10. Depicted is that in one embodiment method sub-step 1004 includes method sub-step 1106. Illustrated is that, in one embodiment, shifting one or more of individual pulses in response to at least one substantially instantaneous magnitude selected out from a random noise reference can include, but is not limited to, prespecifying an upper limit timing variation and a lower limit timing variation for each successive time delay (e.g., for successive time delays defined by at least one ramped signal to be compared to a random waveform, such as was described in relation to FIG. 5). In one device embodiment, method step 1106 is achieved via choosing the resistors and capacitors associated with upward edge shift circuit 202 and downward edge shift circuit 202 such that the timing responses of such circuits fit the parameters described and discussed in relation to FIGS. 4–6. In another embodiment, method step 1106 is achieved via numerical selecting out via a numerical techniques whereby a control program ensures that the numerical shifting of upward and downward edges of individual control signal pulses fit the parameters described and discussed in relation to FIGS. 4–6. (e.g., such as was described in relation to FIGS. 7 and 16).

Figure 12:
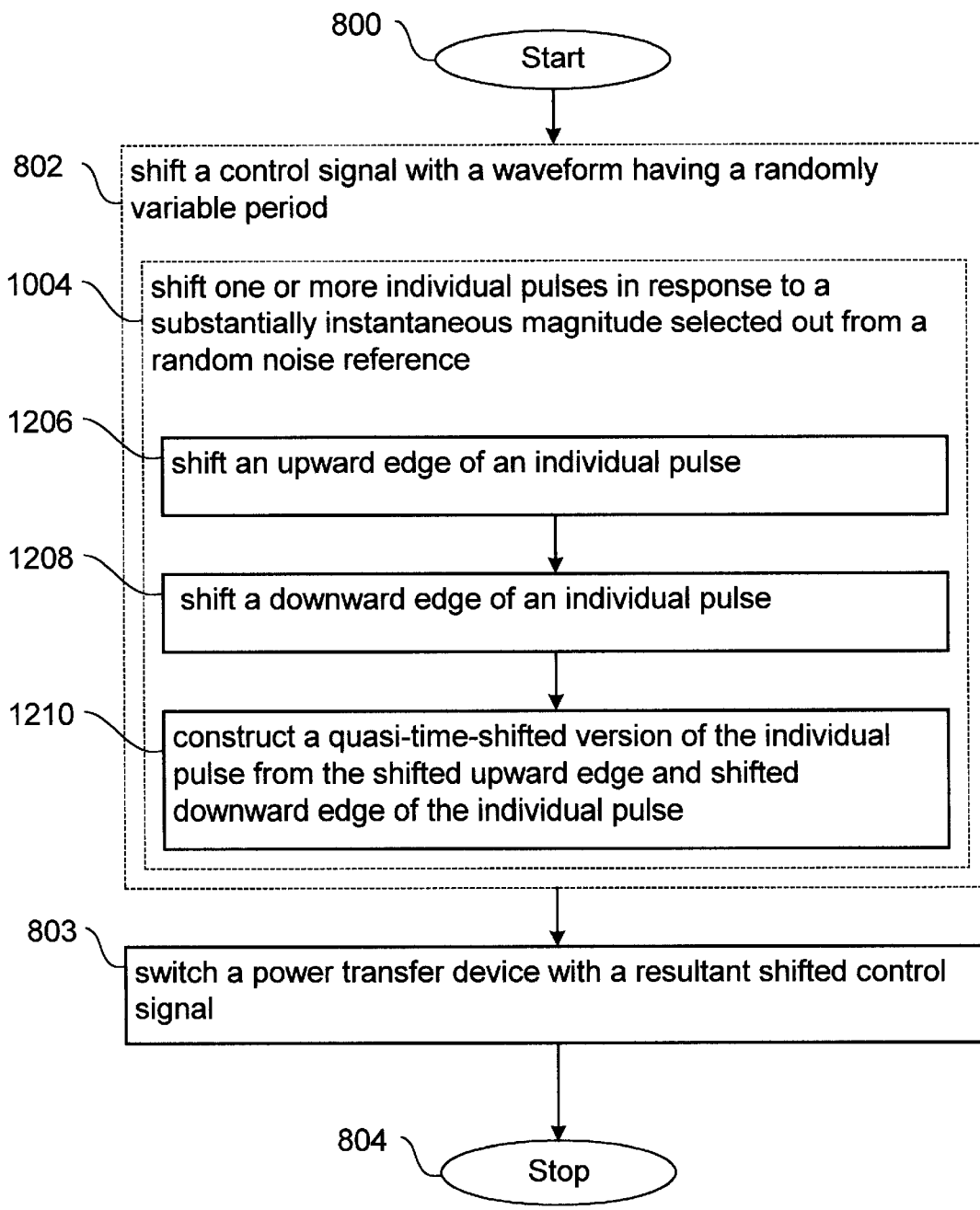
FIG. 12 shows a high-level logic flowchart depicting an alternate embodiment of the high-level logic flowchart of FIG. 10.

With reference now to FIG. 12, shown is a high-level logic flowchart depicting an alternate embodiment of the high-level logic flowchart of FIG. 10. Depicted is that, in one embodiment, method sub-step 1004 (shifting one or more of individual pulses in response to at least one instantaneous magnitude selected out from a random noise reference) can include, but is not limited to, method sub-steps 1206, 1208, and 1210. Method step 1206 illustrates shifting an upward edge of an individual pulse; in one device embodiment, method step 1206 is achieved via analog circuits (e.g., upward edge shift circuit 202), while in another embodiment method step 1206 is achieved computationally via use of numerical techniques (e.g., via a control program running on numerical processor 702). Method step 1208 shows shifting a downward edge of an individual pulse; in one device embodiment, method step 1208 is achieved via analog circuits (e.g., downward edge shift circuit 204), while in another embodiment method step 1208 is achieved computationally via use of numerical techniques (e.g., via a control program running on numerical processor 702). Method step 1210 depicts constructing a quasi-time-shifted version of the individual pulse from the shifted upward edge and shifted downward edge of the individual pulse; in one device embodiment, method step 1210 is achieved via analog circuits (e.g., late transition selector circuit 206 as described in relation to FIG. 3), while in another embodiment method step 1210 is achieved computationally via use of numerical techniques (e.g., via a control program running on numerical processor 702).

Figure 13:
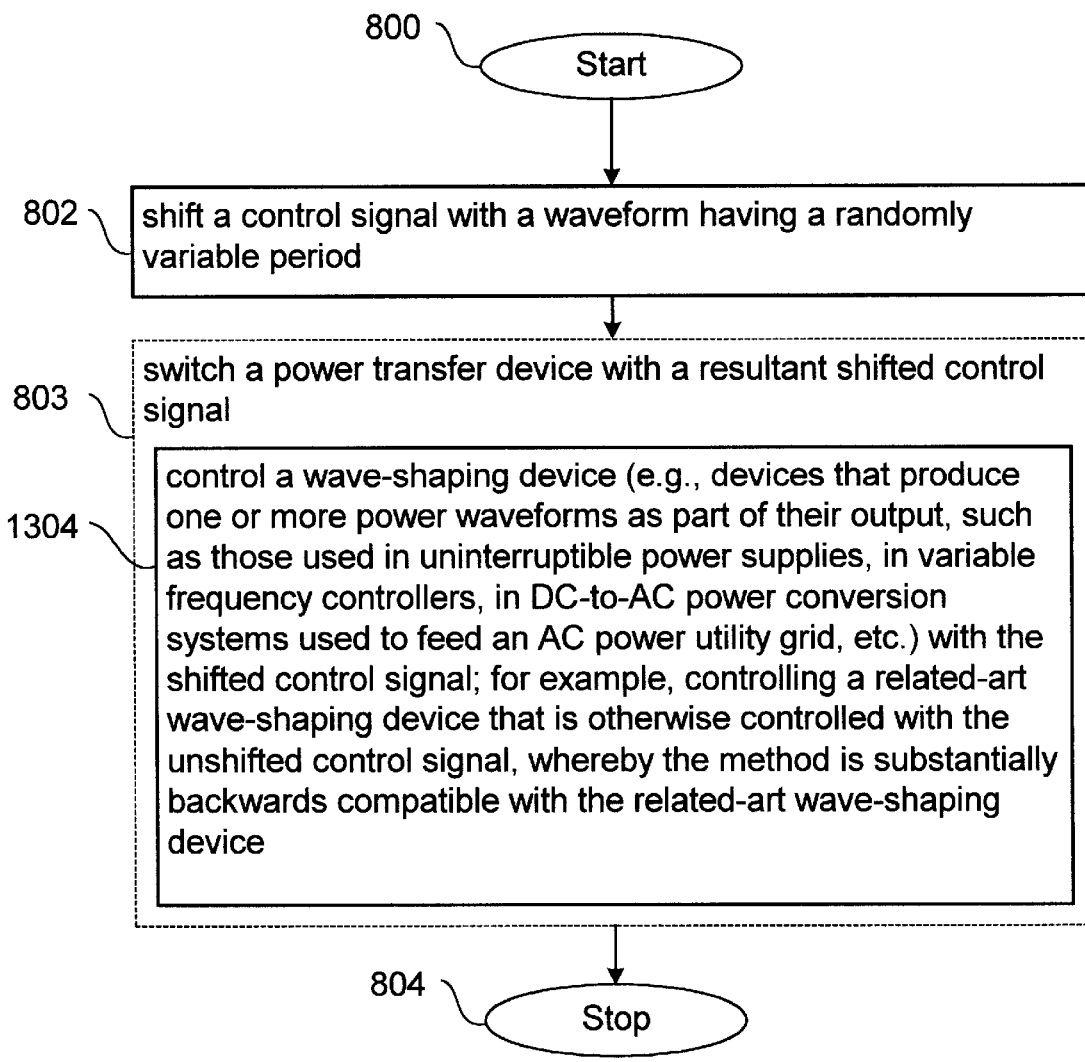
FIG. 13 shows a high-level logic flowchart depicting an alternate embodiment of the high-level logic flowchart of FIG. 8.

With reference now to FIG. 13, shown is a high-level logic flowchart depicting an alternate embodiment of the high-level logic flowchart of FIG. 8. Depicted is that in one embodiment method step 803 includes method sub-step 1304. Illustrated is that, in one embodiment, switching a power transfer device with a resultant shifted control signal can include, but is not limited to, controlling a wave-shaping device (e.g., devices that produce one or more power waveforms as part of their output, such as those used in uninterruptible power supplies, in variable frequency controllers, in DC-to-AC power conversion systems used to feed an AC power utility grid, etc.) with the shifted control signal; for example, controlling a related-art wave-shaping device that is otherwise controlled with the unshifted control signal, whereby the method is substantially backwards compatible with the related-art wave-shaping device. One advantage of controlling the related art wave-shaping device with the shifted control signal is that the detrimental effects of a fixed audio frequency signal are avoided. Another advantage is that sometimes the related-art wave shaping devices can be operated at lower frequencies, again without the detrimental effects of a fixed audio frequency signal. In one device embodiment, method step 1304 is achieved via retrofitting a control signal shift circuit (e.g., control signal shift circuit 116) interposed between control circuit 102 and power transfer device(s) 100, such that substantial backwards compatibility is achieved. That is, such that existing related art systems gain the benefit of control circuit 116. Those having ordinary skill in the art will appreciate that, for proper backwards compatibility, the shifted control signal should preferably still be capable of causing the appropriately shaped power waveform.

Figure 14:
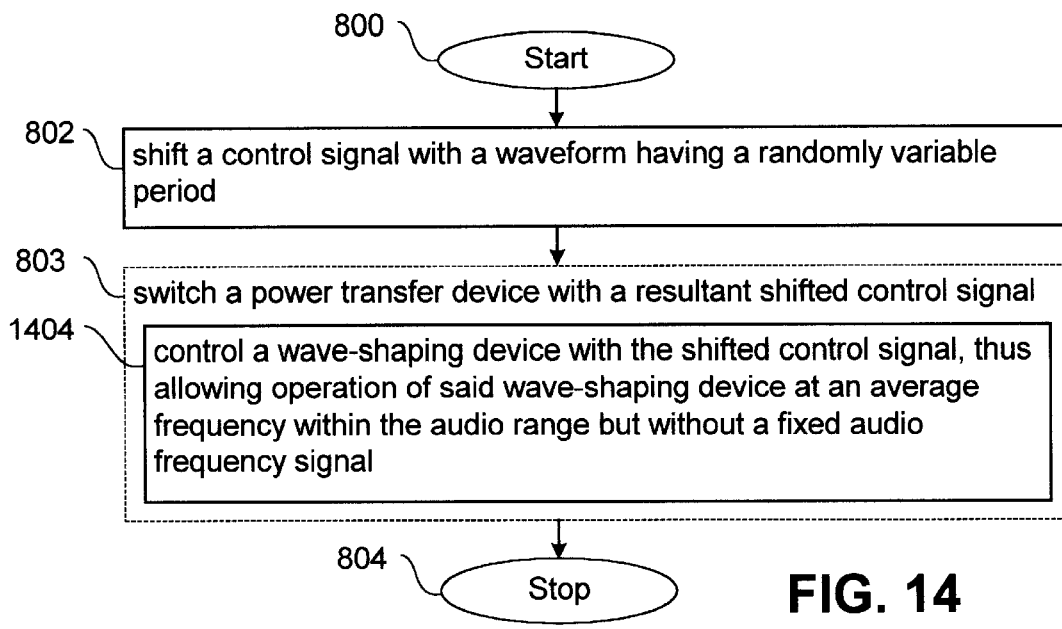
FIG. 14 shows a high-level logic flowchart depicting an alternate embodiment of the high-level logic flowchart of FIG. 8.

With reference now to FIG. 14, shown is a high-level logic flowchart depicting an alternate embodiment of the high-level logic flowchart of FIG. 8. Depicted is that in one embodiment method step 803 includes method sub-step 1404. Illustrated is that, in one embodiment, switching a power transfer device with a resultant shifted control signal can include, but is not limited to, controlling a wave-shaping device (e.g., devices that produce one or more power waveforms as part of their output, such as those used in uninterruptible power supplies, in variable frequency controllers, in DC-to-AC power conversion systems used to feed an AC power utility grid, etc.) thus allowing operation of said wave-shaping device at an average frequency within the audio range but without a fixed audio frequency signal. In one device embodiment, method step 1404 is achieved via retrofitting a control signal shift circuit (e.g., control signal shift circuit 116) interposed between a control circuit (e.g., control circuit 102) and a wave-shaping device (a specific type of more general power transfer device(s) 100). In addition, those skilled in the art will appreciate that both existing related-art systems as well as newer systems can benefit from method step 1404. At a high level, FIG. 14 shows that the shifted control signal will not exhibit detrimental effects sometimes associated with fixed audio frequency control signals.

Figure 15:
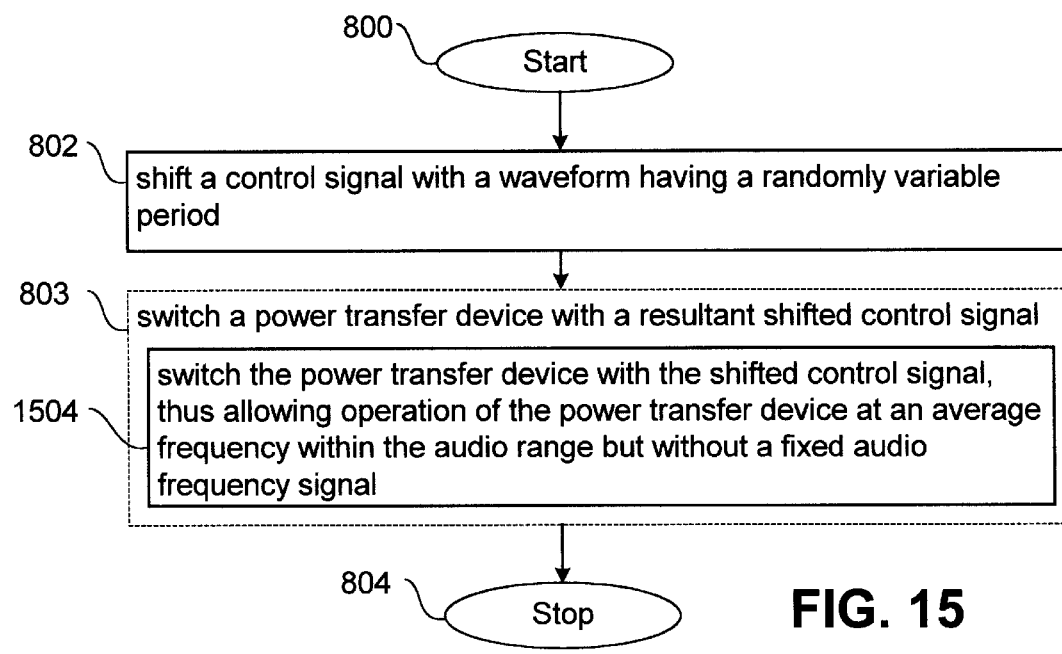
FIG. 15 shows a high-level logic flowchart depicting an alternate embodiment of the high-level logic flowchart of FIG. 8.

With reference now to FIG. 15, shown is a high-level logic flowchart depicting an alternate embodiment of the high-level logic flowchart of FIG. 8. Depicted is that in one embodiment method step 803 includes method sub-step 1504. Illustrated is that, in one embodiment, switching a power transfer device with a resultant shifted control signal can include, but is not limited to, switching the power transfer device (e.g., devices that help regulate power transfer, such as AC-to-DC regulators, switched mode power supplies, etc.) with the shifted control signal, thus allowing operation of said power transfer device at an average frequency within the audio range but without a fixed audio frequency signal. In one device embodiment, method step 1504 is achieved via a control signal shift circuit (e.g., control signal shift circuit 116) interposed between a control circuit (e.g., control circuit 102) and a power transfer device (e.g., power transfer device(s) 100). In addition, those skilled in the art will appreciate that both existing related-art systems as well as newer systems can benefit from method step 1504. At a high level, FIG. 15 shows that the shifted control signal will not exhibit detrimental effects sometimes associated with fixed audio frequency control signals.

Figure 16:
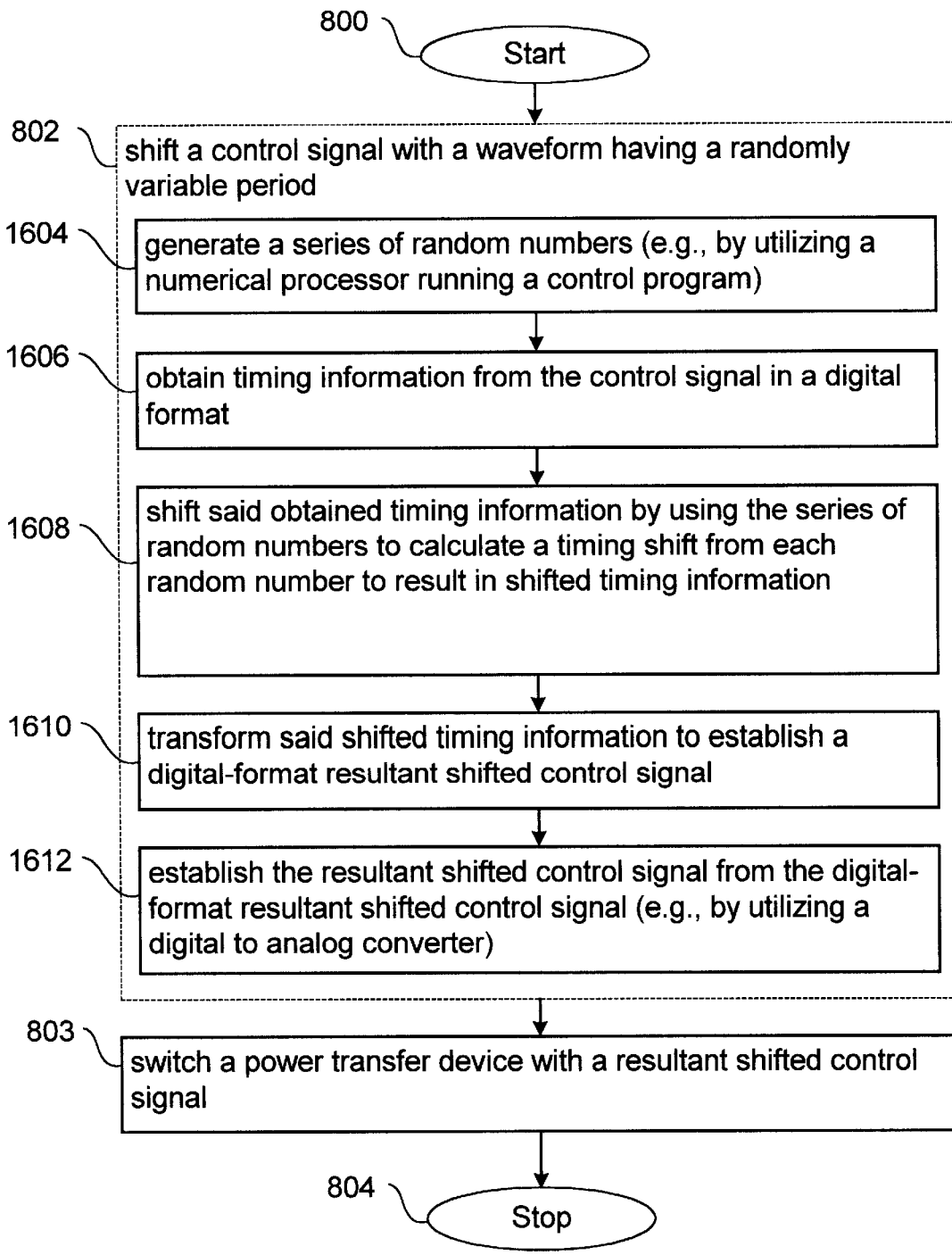
FIG. 16 shows a high-level logic flowchart depicting an alternate embodiment of the high-level logic flowchart of FIG. 8.

Referring now to FIG. 16, shown is a high-level logic flowchart depicting an alternate embodiment of the high-level logic flowchart of FIG. 8. Depicted is that, in one embodiment, method sub-step 802 can include, but is not limited to, method sub-steps 1604, 1606, 1608, 1610, and 1612. Method step 1604 shows generating a series of random numbers (e.g., by utilizing a numerical processor running a control program). Method step 1606 depicts obtaining timing information from the control signal in a digital format (e.g., by capture of the time at which the control signal upward transitions and downward transitions via use of A/D converters or by recall if the control signal is already in digital format). Method step 1608 illustrates shifting said obtained timing information by using the series of random numbers to calculate a timing shift from each random number to result in shifted timing information (e.g., computationally shifting the obtained control signal within the constraints explained in relation to FIGS. 4A–4D, 5, and 6); that is, method step 1608 can make use of virtually any calculation method that maintains an appropriate probability distribution for random timing variations. For example, if the range of digital random numbers is established between 0 and 1023 and the desired timing variation is plus or minus 100 milliseconds then variation V may be expressed as:

$$V=200 \text{ milliseconds}*(R-511)/1024$$

where R is one instance of the digital random number. As noted in relation to FIG. 4, several other probability distribution functions are acceptable. Method step 1610 shows transforming the shifted timing information to establish a digital-format resultant shifted control signal (e.g., by using a control program in conjunction with numerical processing). Method step 1612 depicts establishing the resultant shifted control signal from the digital-format resultant shifted control signal (e.g., by utilizing a digital to analog converter). In one embodiment, the process of FIG. 16 is achieved via the components shown and described in relation to FIG. 7.

Figure 17:
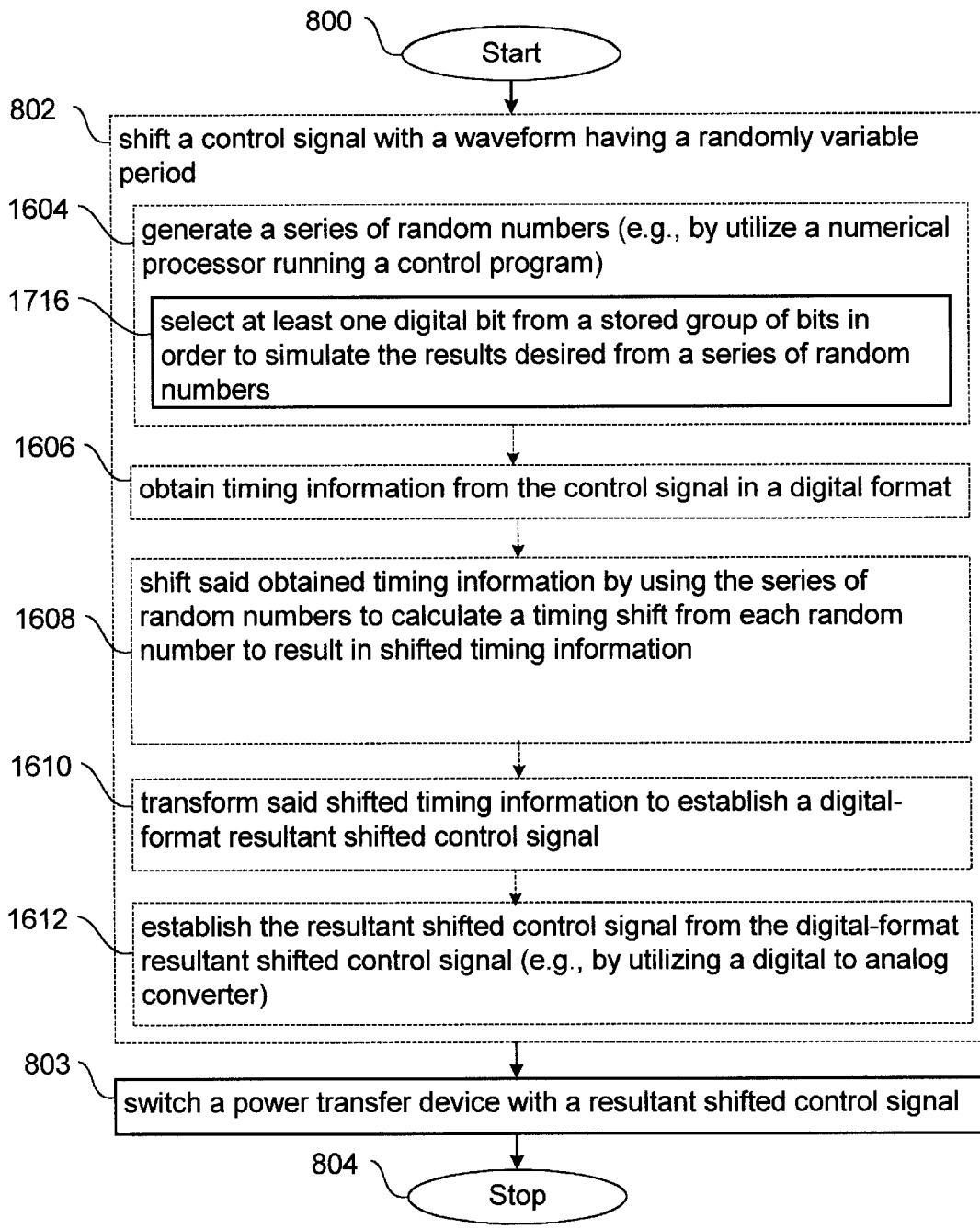
FIG. 17 shows a high-level logic flowchart depicting an alternate embodiment of the high-level logic flowchart of FIG. 16.

With reference now to FIG. 17, shown is a high-level logic flowchart depicting an alternate embodiment of the high-level logic flowchart of FIG. 16. Depicted is that in one embodiment method step 1604 includes method sub-step 1716. Illustrated is that, in one embodiment, generating a series of random numbers can include, but is not limited to, selecting at least one digital bit from a stored group of digital bits in order to simulate the results desired from a series of random numbers. Method step 1716 offers alternative methods to calculating random numbers. One example of method step 1716 would be a system providing a set of pseudo random numbers in memory, which will allow the implementer to "tame" the number set so there are no dramatic numeric adjacencies, while maintaining the effect of a random number set. That is, in one device embodiment of method step 1716, a numerical processor (e.g., numerical processor) 702 retrieves random numbers from a random number source (e.g., random number source 706) where the random numbers retrieved have been pre-stored rather than calculated, while in another implementation random number source 706 actually calculates random numbers.

Figure 18:
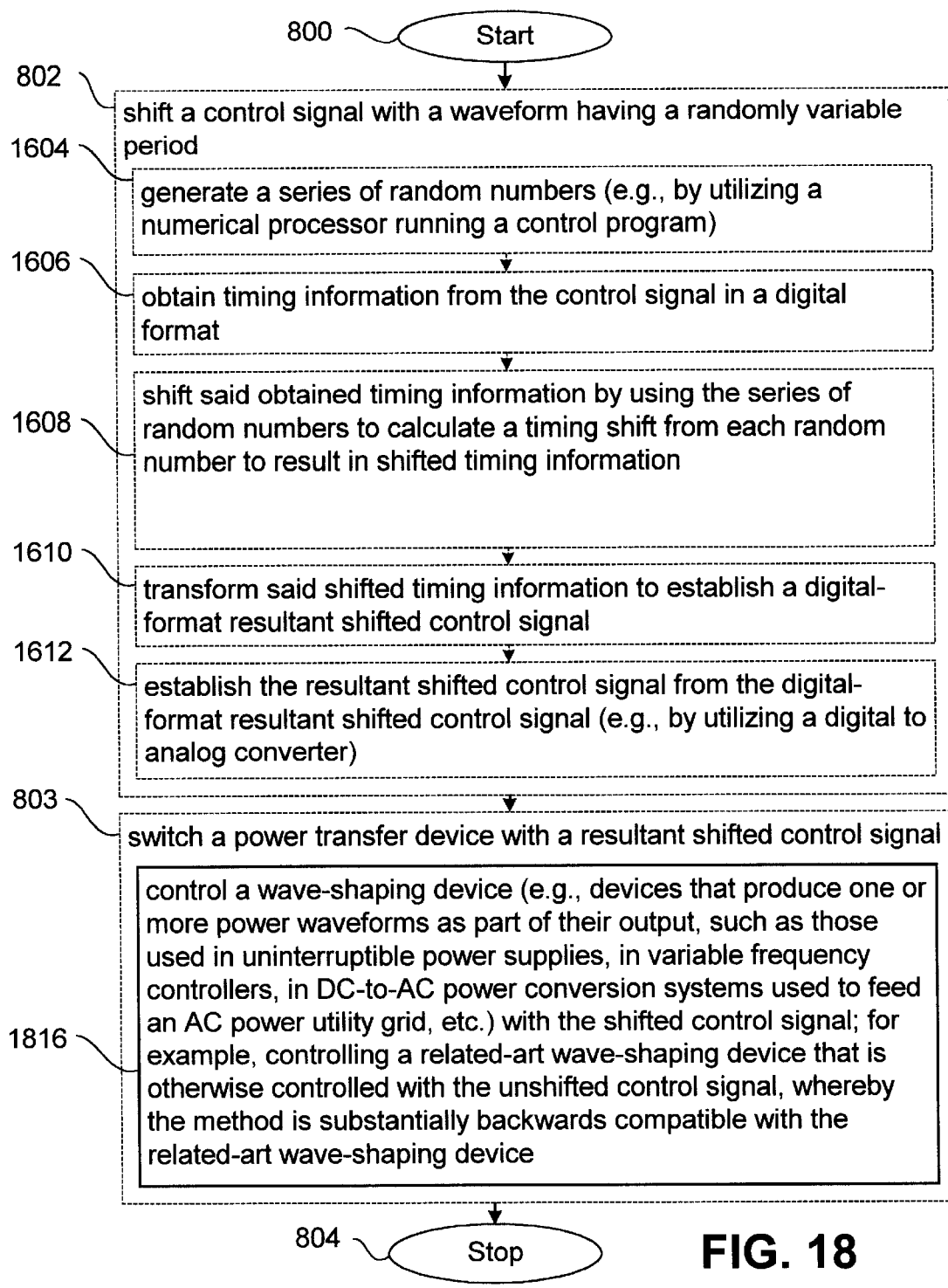
FIG. 18 shows a high-level logic flowchart depicting an alternate embodiment of the high-level logic flowchart of FIG. 16.

Referring now to FIG. 18, shown is a high-level logic flowchart depicting an alternate embodiment of the high-level logic flowchart of FIG. 16. Depicted is that in one embodiment method step 803 includes method sub-step 1816. The process shown is substantially similar to that depicted in FIG. 13, but where the shifted control signal is produced via numerical/computational techniques.

Figure 19:
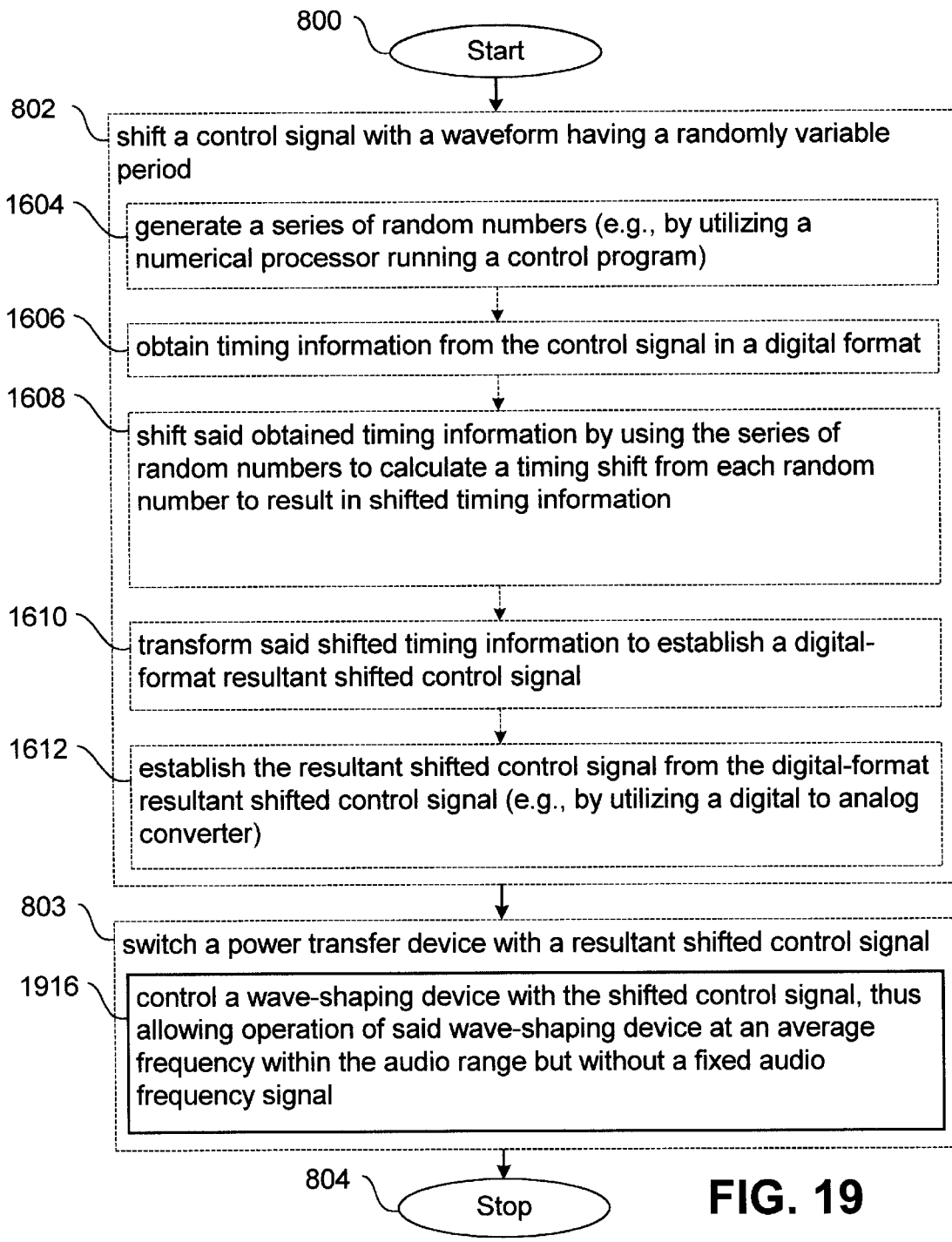
FIG. 19 shows a high-level logic flowchart depicting an alternate embodiment of the high-level logic flowchart of FIG. 16.

Referring now to FIG. 19, shown is a high-level logic flowchart depicting an alternate embodiment of the high-level logic flowchart of FIG. 16. Depicted is that in one embodiment method step 803 includes method sub-step 1916. The process shown is substantially similar to that depicted in FIG. 14, but where the shifted control signal is produced via numerical/computational techniques.

Figure 20:
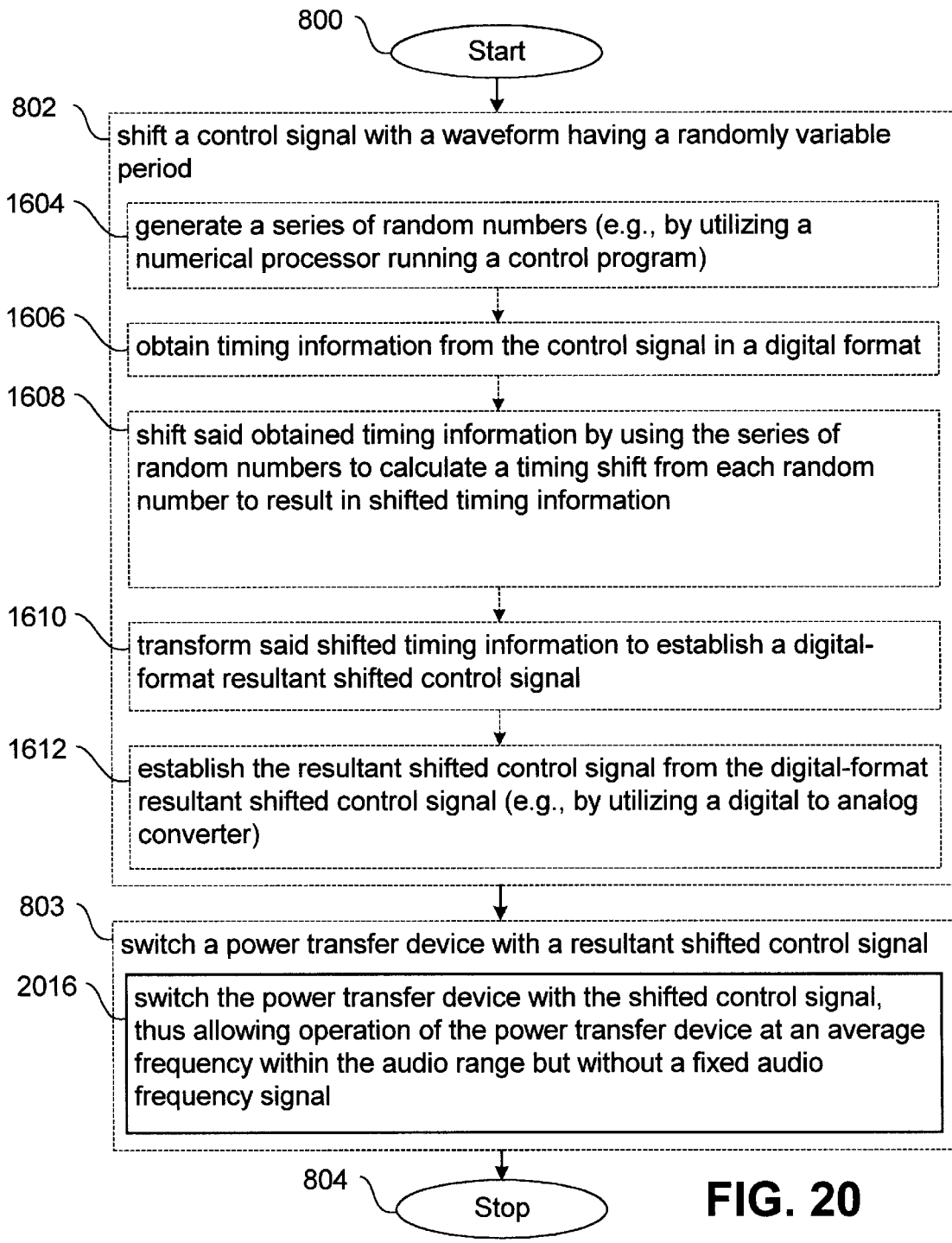
FIG. 20 shows a high-level logic flowchart showing an alternate embodiment of the high-level logic flowchart of FIG. 16.

Referring now to FIG. 20, shown is a high-level logic flowchart depicting an alternate embodiment of the high-level logic flowchart of FIG. 16. Depicted is that in one embodiment method step 803 includes method sub-step 2016. The process shown is substantially similar to that depicted in FIG. 15, but where the shifted control signal is produced via numerical/computational techniques.

Referring now to FIGS. 21A, 21B, 21C and 21D, depicted are relationships between the input pulse width of a control signal and the average pulse width of the resulting shifted control signal which illustrate screening out at least one pulse from a train of pulses in the control signal (e.g., control signal 104). The graphs demonstrate an additional advantage of these collected methods. In particular, it is possible to select which control signals to pass through the control signal shift circuit shown in FIG. 3. The selection is made based on the minimum pulse width of a control signal. Further, the selection of circuit components, or the development of a software algorithm or an implementation in firmware can be designed to select from a range of minimum pulse widths. In cases where the pulse width of a control signal is small it is inefficient to cause the related power circuit to jump through two switching transitions because the small pulse width has little effect on the final output—thus energy is wasted for little purpose. One set of possible relationships between input pulse width and resulting pulse width is shown in FIGS. 21A through 21D. The value of AD in each of the reference diagrams is the average delay of the upward and downward pulse shift circuits (i.e., 202 and 204). The actual minimum pulse passed through the circuit depends on the range of possible values of the random waveform—thus, the reference to "average" values. The selection of values for R11, D11 and R21, D21 in FIG. 3 defines the different curves shown in FIG. 21A, 21B, and 21C.

Figure 21A:
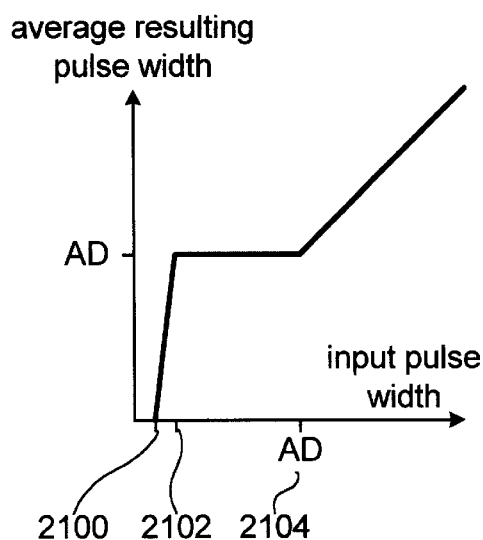
FIGS. 21A, 21B, 21C and 21D, depict relationships between the input pulse width of a control signal and the average pulse width of the resulting shifted control signal which illustrate screening out at least one pulse from a train of pulses in control signal 104.

Referring now to FIG. 21A and FIG. 3, in case 1, with the resistance value for R11 and R21 much smaller than the resistance value for R12 and R22 respectively, then the average minimum pulse width 2100 passed through the circuit may be selected as arbitrarily small. (Note: the resistance values for R13 and R23 are much larger than the resistance values for R12 and R22 respectively.) In case 1, the average width of the pulse passed is AD for input pulse widths between 2102 and 2104.

Figure 21B:
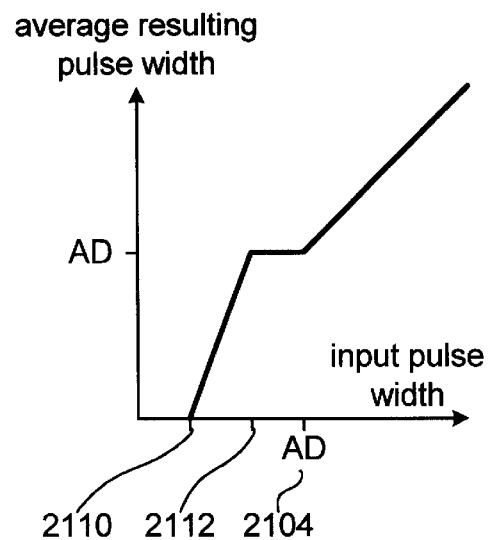

Referring now to FIG. 21B and FIG. 3, in case 2, the resistance value for R11 is selected such that R11 in parallel with R12 is the resistance value of R12 divided by 3—similar for R21 and R22. (Note: the resistance values for R13 and R23 are much larger than the resistance values for R12 and R22 respectively.) Then the average minimum pulse width 2110 passed through the circuit is the average delay (AD) divided by 3. Further, the resulting average pulse width increases between 2110 and 2112 and is on average AD between 2112 and 2104. This curve has the functional characteristic of averaging to a straight line through the origin of the graph—so that the fidelity of power transfer is maintained for small pulse widths (when the pulse widths are evenly distributed at least from zero to AD). Thus, this selection of components will prevent small pulse width signals from causing transitions, but will maintain the desired output for wave-shaping devices with zero crossings (e.g., devices that create an AC sign-wave output).

Figure 21C:
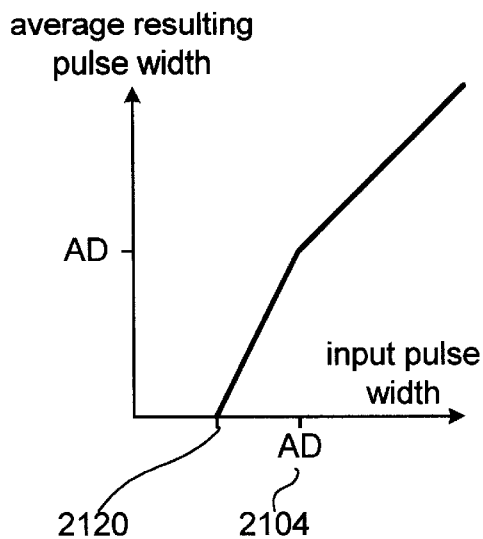

Referring now to FIG. 21C and FIG. 3, in case 3, the resistance value for R11 is selected such that R11 in parallel with R12 have the resistance value of R12 divided by 2—similar for R21 and R22. (This is basically the case where the resistance value of R11 equals the resistance value of R12. Note: the resistance values for R13 and R23 are much larger than the resistance values for R12 and R22 respectively.) Then the average minimum pulse width 2120 passed through the circuit is AD divided by 2. Further, the resulting average pulse width increases between 2120 and 2104.

Figure 21D:
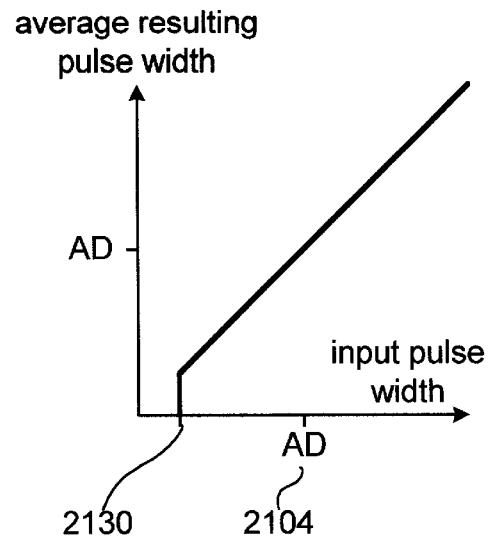

Referring now to FIG. 21D and FIG. 7, in case 4, the average minimum pulse allowed is programmed in a digital environment with a pre-selected cutoff. The average minimum pulse width 2130 can be programmed independently of the average delay 2104 (AD).

Those having ordinary skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having ordinary skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as one or more computer programs running on one or more computers (e.g., as one or more programs running on one or more computer systems), as one or more programs running on one or more processors (e.g., as one or more programs running on one or more processors), as firmware, or as virtually any combination thereof, and that designing the circuitry and/or writing the code for the software and or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analogue communication links using TDM or IP based communication links (e.g., packet links).

In a general sense, those skilled in the art will recognize that the various embodiments described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into data processing systems. That is, at least a portion of the devices and/or processes described herein can be integrated into a data processing system via a reasonable amount of experimentation. Those having ordinary skill in the art will recognize that a typical data processing system generally includes at least a system unit housing, a video display device, a keyboard, a mouse, and a microphone. A typical data processing system may be implemented utilizing any suitable commercially available computer system.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an"; the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

The embodiments of the invention in which an exclusive property or privilege is claimed are defined as follows:

1. A method for use with a power transfer device comprising:
    shifting a control signal with a waveform having a randomly variable period to obtain a resultant control signal, wherein said shifting a control signal with a waveform having a randomly variable period includes:
        introducing at least one random timing variation into a fixed-frequency periodic control signal; and
        switching said power transfer device with the resultant shifted control signal.

2. The method of claim 1, wherein said power transfer device comprises: a DC-to-AC converter, a DC-to-DC pulse width modulated converter, a DC-to-transformer tank circuit controller, a DC-to-wave generating controller, a DC-to-AC power converter, or an AC-to-AC power flow controller.

3. The method of claim 1, wherein said shifting a control signal with a waveform having a randomly variable period comprises:
    shifting one or more individual pulses in response to at least one substantially instantaneous magnitude selected out from a random noise reference.

4. The method of claim 3, wherein said shifting one or more individual pulses in response to at least one substantially instantaneous magnitude selected out from a random noise reference comprises:
    prespecifying an upper limit timing variation and a lower limit timing variation for each successive time delay.

5. The method of claim 3, wherein said shifting one or more individual pulses in response to at least one substantially instantaneous magnitude selected out from a random noise reference comprises:
    screening at least one pulse from the control signal to obtain the one or more individual pulses.

6. The method of claim 3, wherein said shifting one or more individual pulses in response to at least one substantially instantaneous magnitude selected out from a random noise reference comprises:
    shifting an upward edge of an individual pulse;
    shifting a downward edge of the individual pulse; and
    constructing a quasi-time-shifted version of the individual pulse from the shifted upward edge and shifted downward edge of the individual pulse.

7. The method of claim 1, wherein said switching said power transfer device with the resultant shifted control signal comprises:
    controlling a wave-shaping device with the shifted control signal.

8. The method of claim 7, wherein said controlling a wave-shaping device with the shifted control signal comprises:
    controlling a wave-shaping device in an uninterruptible power system, or a wave-shaping device in a variable frequency motor controller, or a wave-shaping device in a DC-to-AC power conversion system used to feed an AC power utility grid.

9. The method of claim 7, wherein the wave-shaping device is a related-art wave-shaping device that is otherwise controlled with the unshifted control signal, whereby the method is substantially backwards compatible with the related-art wave-shaping device.

10. The method of claim 1, wherein said switching said power transfer device with the resultant shifted control signal comprises:
    controlling a wave-shaping device with the shifted control signal, thus allowing operation of said wave-shaping device at an average frequency within the audio range but without a fixed audio frequency signal.

11. The method of claim 1, wherein said power transfer device is a related-art power transfer device that is otherwise switched with the unshifted control signal, whereby the method is substantially backwards compatible with the related-art power transfer device.

12. The method of claim 1, wherein said switching said power transfer device with the resultant shifted control signal comprises:
    switching said power transfer device with the shifted control signal, thus allowing operation of said power transfer device at an average frequency within the audio range but without a fixed audio frequency signal.

13. The method of claim 1, wherein said shifting a control signal with a waveform having a randomly variable period comprises:
    generating a series of random numbers;
    obtaining timing information from the control signal in a digital format;
    shifting said obtained timing information by using the series of random numbers to calculate a timing shift from each random number to result in shifted timing information;
    transforming said shifted timing information to establish a digital-format resultant shifted control signal; and
    establishing the resultant shifted control signal from the digital-format resultant shifted control signal.

14. The method of claim 13, wherein said generating a series of random numbers comprises: selecting at least one digital bit from a stored group of digital bits in order to simulate the results desired from a series of random numbers.

15. The method of claim 13, wherein said switching said power transfer device with the resultant shifted control signal comprises:
    controlling a wave-shaping device with the shifted control signal.

16. The method of claim 15, wherein said controlling a wave-shaping device with the shifted control signal comprises:
    controlling a wave-shaping device in an uninterruptible power system, or a wave-shaping device in a variable frequency motor controller, or a wave-shaping device in a DC-to-AC power conversion system used to feed an AC power utility grid.

17. The method of claim 15, wherein the wave-shaping device is a related-art wave-shaping device that is otherwise controlled with the unshifted control signal, whereby the method is substantially backwards compatible with the related-art wave-shaping device.

18. The method of claim 13, wherein said switching said power transfer device with the resultant shifted control signal comprises:

controlling a wave-shaping device with the shifted control signal, thus allowing operation of said wave-shaping device at an average frequency within the audio range but without a fixed audio frequency signal.

19. The method of claim 13, wherein said power transfer device is a related-art power transfer device that is otherwise switched with the unshifted control signal, whereby the method is substantially backwards compatible with the related-art power transfer device.

20. The method of claim 13, wherein said switching said power transfer device with the resultant shifted control signal comprises:

switching said power transfer device with the shifted control signal, thus allowing operation of said power transfer device at an average frequency within the audio range but without a fixed audio frequency signal.

21. A system for use with a power transfer device comprising:

means for shifting a control signal with a waveform having a randomly variable period to obtain a resultant control signal, wherein said means for shifting a control signal with a waveform having a randomly variable period includes:

means for introducing at least one random timing variation into a fixed-frequency periodic control signal; and means for switching said power transfer device with the resultant shifted control signal.

22. The system of claim 21, wherein said power transfer device comprises:

a DC-to-AC converter, a DC-to-DC pulse width modulated converter, a DC-to-transformer tank circuit controller, a DC-to-wave generating controller, a DC-to-AC power converter, or an AC-to-AC power flow controller.

23. The system of claim 21, wherein said means for shifting a control signal with a waveform having a randomly variable period comprises:

means for shifting one or more individual pulses in response to at least one substantially instantaneous magnitude selected out from a random noise reference.

24. The system of claim 23, wherein said means for shifting one or more individual pulses in response to at least one substantially instantaneous magnitude selected out from a random noise reference comprises:

means for prespecifying an upper limit timing variation and a lower limit timing variation for each successive time delay.

25. The system of claim 23, wherein said means for shifting one or more individual pulses in response to at least one substantially instantaneous magnitude selected out from a random noise reference comprises:

means for screening at least one pulse from the control signal to obtain the one or more individual pulses.

26. The system of claim 23, wherein said means for shifting one or more individual pulses in response to at least one substantially instantaneous magnitude selected out from a random noise reference comprises:

means for shifting an upward edge of an individual pulse;
means for shifting a downward edge of the individual pulse; and
means for constructing a quasi-time-shifted version of the individual pulse from the shifted upward edge and shifted downward edge of the individual pulse.

27. The system of claim 21, wherein said means for switching said power transfer device with the resultant shifted control signal comprises:

means for controlling a wave-shaping device with the shifted control signal.

28. The system of claim 27, wherein said means for controlling a wave-shaping device with the shifted control signal comprises:

means for controlling a wave-shaping device in an uninterruptible power system, or a wave-shaping device in a variable frequency motor controller, or a wave-shaping device in a DC-to-AC power conversion system used to feed an AC power utility grid.

29. The system of claim 27, wherein the wave shaping device is a related-art wave-shaping device that is otherwise controlled with the unshifted control signal, whereby the method is substantially backwards compatible with the related-art wave-shaping device.

30. The system of claim 21, wherein said means for switching said power transfer device with the resultant shifted control signal comprises:

means for controlling a wave-shaping device with the shifted control signal, thus allowing operation of said wave-shaping device at an average frequency within the audio range but without a fixed audio frequency signal.

31. The method of claim 21, wherein said power transfer device is a related-art power transfer device that is otherwise switched with the unshifted control signal, whereby the method is substantially backwards compatible with the related-art power transfer device.

32. The system of claim 21, wherein said means for switching said power transfer device with the resultant shifted control signal comprises:

means for switching said power transfer device with the shifted control signal, thus allowing operation of said power transfer device at an average frequency within the audio range but without a fixed audio frequency signal.

33. The system of claim 21, wherein said means for shifting a control signal with a waveform having a randomly variable period comprises:

means for generating a series of random numbers;
means for obtaining timing information from the control signal in a digital format;
means for shifting said obtained timing information by using the series of random numbers to calculate a timing shift from each random number to result in shifted timing information;
means for transforming said shifted timing information to establish a digital-format resultant shifted control signal; and
means frr establishing the resultant shifted control signal from the digital-format resultant shifted control signal.

34. The system of claim 33, wherein said means for generating a series of random numbers comprises: means for selecting at least one digital bit from a stored group of digital bits in order to simulate the results desired from a series of random numbers.

35. The system of claim 33, wherein said means for switching said power transfer device with the resultant shifted control signal comprises:

means for controlling a wave-shaping device with the shifted control signal.

36. The system of claim 35, wherein said means for controlling a wave-shaping device with the shifted control signal comprises:

means for controlling a wave-shaping device in an uninterruptible power system, or a wave-shaping device in a variable frequency motor controller, or a wave-shaping device in a DC-to-AC power conversion system used to feed an AC power utility grid.

37. The system of claim 35, wherein the wave-shaping device is a related-art wave-shaping device that is otherwise controlled with the unshifted control signal, whereby the method is substantially backwards compatible with the related-art wave-shaping device.

38. The system of claim 33, wherein said means for switching said power transfer device with the resultant shifted control signal comprises:

means for controlling a wave-shaping device with the shifted control signal, thus allowing operation of said wave-shaping device at an average switching frequency within the audio range but without a fixed audio frequency signal.

39. The system of claim 33, wherein said power transfer device is a related-art power transfer device that is otherwise switched with the unshifted control signal, whereby the method is substantially backwards compatible with the related-art power transfer device.

40. The system of claim 33, wherein said means for switching said power transfer device with the resultant shifted control signal comprises:

means for switching said power transfer device with the shifted control signal, thus allowing operation of said power transfer device at an average frequency within the audio range but without a fixed audio frequency signal.

41. A system for use with a power transfer device comprising:

a control signal shift circuit having an input operably coupled to a control circuit and an output operably coupled to said power transfer device, said control signal shift circuit adapted to operably couple with at least one random waveform.

42. The system of claim 41, wherein said control signal shift circuit comprises:

a pulse buffer circuit.

43. The system of claim 41, wherein said control signal shift circuit comprises:

an upward pulse shift circuit.

44. The system of claim 41, wherein said control signal shift circuit comprises:

a downward pulse shift circuit.

45. The system of claim 41, wherein said control signal shift circuit comprises:

a late transition selector circuit.

46. The system of claim 41, wherein said control signal shift circuit comprises:

a processor configured by a control program.

47. The system of claim 41, wherein said control signal shift circuit comprises:

an analog-to-digital converter.

48. The system of claim 41, wherein said control signal shift circuit comprises:

a digital-to-analog converter.

49. The system of claim 41, wherein said power transfer device comprises:

a DC-to-AC converter, a DC-to-DC pulse width modulated converter, a DC-to-transformer tank circuit controller, a DC-to-wave generating controller, a DC-to-AC power converter, or an AC-to-AC power flow controller.

50. The system of claim 41, wherein said power transfer device comprises:

a wave-shaping device.

* * * * *

UNITED STATES PATENT AND TRADEMARK OFFICE
CERTIFICATE OF CORRECTION

PATENT NO. : 6,510,068 B1
DATED : January 21, 2003
INVENTOR(S) : Douglas A. Bors It is certified that error appears in the above-identified patent and that said Letters Patent is hereby corrected as shown below:

<u>Column 22,</u>
Line 53, "means frr establishing" should read -- means for establishing --.

Signed and Sealed this

Eighth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,510,068 B1  
DATED         : January 21, 2003  
INVENTOR(S)   : Douglas A. Bors Page 1 of 1

It is certified that error appears in the above-identified patent and that said Letters Patent is hereby corrected as shown below:

Column 19,  
Lines 17 to 26,                                should read

"1. A method for use with a power transfer device comprising:
    shifting a control signal with a waveform having a randomly variable period to obtain a resultant control signal, wherein said shifting a control signal with a waveform having a randomly variable period includes: introducing at least one random timing variation into a fixed-frequency periodic control signal; and
    switching said power transfer device with the resultant shifted control signal."

--1. A method for use with a power transfer device comprising:
    shifting a control signal with a waveform having a randomly variable period to obtain a resultant control signal, wherein said shifting a control signal with a waveform having a randomly variable period includes: introducing at least one random timing variation into a fixed-frequency periodic control signal; and
    switching said power transfer device with the resultant shifted control signal.--

Column 21,  
Lines 21 to 31,                                should read

"21. A system for use with a power transfer device comprising:
    means for shifting a control signal with a waveform having a randomly variable period to obtain a resultant control signal, wherein said means for shifting a control signal with a waveform having a randomly variable period includes:
    means for introducing at least one random timing variation into a fixed-frequency periodic control signal; and
    means for switching said power transfer device with the resultant shifted control signal."

--21. A system for use with a power transfer device comprising:
    means for shifting a control signal with a waveform having a randomly variable period to obtain a resultant control signal, wherein said means for shifting a control signal with a waveform having a randomly variable period includes:
    means for introducing at least one random timing variation into a fixed-frequency periodic control signal; and
    means for switching said power transfer device with the resultant shifted control signal."

Signed and Sealed this

Ninth Day of September, 2003

JAMES E. ROGAN  
*Director of the United States Patent and Trademark Office*